US012190147B2

(12) United States Patent
Sivathanu et al.

(10) Patent No.: US 12,190,147 B2
(45) Date of Patent: Jan. 7, 2025

(54) TRANSPARENT PRE-EMPTION AND MIGRATION FOR PLANET-SCALE COMPUTER

(71) Applicant: Microsoft Technology Licensing, LLC, Redmond, WA (US)

(72) Inventors: Muthian Sivathanu, Chennai (IN); Srinidhi Viswanatha, Bangalore (IN); Dharma Kiritkumar Shukla, Bellevue, WA (US); Nipun Kwatra, Bangalore (IN); Ramachandran Ramjee, Bengaluru (IN); Rimma Vladimirovna Nehme, Bellevue, WA (US); Pankaj Sharma, Redmond, WA (US); Bhalakumaaran Erode Ranganathan, Bellevue, WA (US); Vaibhav Sharma, Seattle, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 803 days.

(21) Appl. No.: 17/359,553

(22) Filed: Jun. 26, 2021

(65) Prior Publication Data

US 2022/0308917 A1 Sep. 29, 2022

(30) Foreign Application Priority Data

Mar. 25, 2021 (IN) .............................. 202141013182

(51) Int. Cl.
*G06F 9/48* (2006.01)
*G06F 9/46* (2006.01)
(Continued)

(52) U.S. Cl.
CPC ............ *G06F 9/4856* (2013.01); *G06F 9/461* (2013.01); *G06F 9/54* (2013.01); *G06N 3/08* (2013.01);
(Continued)

(58) Field of Classification Search
CPC .......... G06F 9/4856; G06F 9/461; G06F 9/54; G06F 2209/509; G06F 9/5088;
(Continued)

(56) References Cited

U.S. PATENT DOCUMENTS

| 6,622,263 | B1 * | 9/2003 | Stiffler | ................ G06F 11/1469 |
| | | | | 714/13 |
| 2011/0084973 | A1 * | 4/2011 | Masood | .............. G06F 9/45558 |
| | | | | 345/506 |
| 2021/0256418 | A1 * | 8/2021 | Creedon | ................... G06N 3/08 |

OTHER PUBLICATIONS

Rojas et al., "A Study of Checkpointing in large Scale Training of Deep Neural Networks" (Dec. 1, 2020), pp. 1-8 [retrieved from https://arxiv.org/abs/2012.00825v1]. (Year: 2020).*

(Continued)

*Primary Examiner* — Brian W Wathen
(74) *Attorney, Agent, or Firm* — Barta Jones, PLLC

(57) ABSTRACT

The disclosure herein describes platform-level checkpointing for deep learning (DL) jobs. The checkpointing is performed through capturing two kinds of state data: (i) GPU state (device state), and (ii) CPU state (host state). The GPU state includes GPU data (e.g., model parameters, optimizer state, etc.) that is located in the GPU and GPU context (e.g., the default stream in GPU, various handles created by the libraries such as DNN, Blas, etc.). Only a fraction of the GPU memory is copied because the checkpointing is done in a domain-aware manner. The "active" memory contains useful data like model parameters. To be able to capture the useful data, memory management is controlled to identify which parts of the memory are active. Also, to restore the destination GPU to the same context/state, a mechanism is used to capture such state-changing events on an original GPU and replayed on a destination GPU.

19 Claims, 10 Drawing Sheets

(51) Int. Cl.
*G06F 9/54* (2006.01)
*G06N 3/08* (2023.01)
*G06T 1/20* (2006.01)
*G06T 1/60* (2006.01)
*H04L 67/568* (2022.01)

(52) U.S. Cl.
CPC ................ *G06T 1/20* (2013.01); *G06T 1/60* (2013.01); *H04L 67/568* (2022.05)

(58) Field of Classification Search
CPC .......... G06F 9/522; G06N 3/08; G06N 3/063; G06T 1/20; G06T 1/60; H04L 67/568; H04L 67/63
See application file for complete search history.

(56) References Cited

OTHER PUBLICATIONS

Horovod, "API horovod.tensorflow" (Sep. 26, 2020), pp. 1-42 [retrieved from https://web.archive.org/web/20200926011033/https://horovod.readthedocs.io/en/latest/api.html]. (Year: 2020).*

Cui et al., "Lightweight Virtual Machine Checkpoint and Rollback for Long-running Applications" (Nov. 2015), ICA3PP 2015, Part III, LNCS9530, pp. 577-596 [retrieved from https://link.springer.com/chapter/10.1007/978-3-319-27137-8_42]. (Year: 2015).*

Xiao et al., "Gandiva: Introspective Cluster Scheduling for Deep Learning" (2018), 13th USENIX Symposium on Operating Systems Design and Implementation, pp. 595-610 [retrieved from https://www.usenix.org/conference/osdi18/presentation/xiao]. (Year: 2018).*

Chaudhary, et al., "Balancing Efficiency and Fairness in Heterogeneous GPU Clusters for Deep Learning", In Proceedings of the Fifteenth European Conference on Computer Systems, Apr. 27, 2020, 16 Pages.

Hong, et al., "GPU Virtualization and Scheduling Methods: A Comprehensive Survey", In Journal of ACM Computing Surveys, vol. 50, Issue 3, Jun. 29, 2017, pp. 1-37.

"International Search Report and Written Opinion Issued in PCT Application No. PCT/US22/018592", Mailed Date: May 17, 2022, 12 Pages.

"Akka", Retrieved from: https://web.archive.org/web/20210413062408/https://akka.io/, Apr. 13, 2021, 4 Pages.

"Checkpoint/Restore in User Space", Retrieved from: https://web.archive.org/web/20210326043234/https://criu.org/Main_Page, Mar. 26, 2021, 3 Pages.

"gRPC, A High-Performance, Open-source Universal RPC Framework.", Retrieved from: https://web.archive.org/web/20210416144134/https://grpc.io/, Apr. 16, 2021, 2 Pages.

"Hadoop: Fair Scheduler", Retrieved from: https://hadoop.apache.org/docs/r2.7.4/hadoop-yarn/hadoop-yarn-site/FairScheduler.html, Jul. 29, 2017, 7 Pages.

"The Scala Programming Language", Retrieved from: https://www.scala-lang.org/, Apr. 18, 2021, 13 Pages.

Ausubel, et al., "The Lovely but Lonely Vickrey Auction", In Book Combinatorial Auctions, vol. 17, Jan. 2006, 37 Pages.

Boag, et al., "Scalable Multi-Framework Multi-Tenant Lifecycle Management of Deep Learning Training Jobs", In Proceedings of 31st Conference on Neural Information Processing Systems, Dec. 4, 2017, pp. 1-8.

Burns, et al., "Borg, Omega, and Kubernetes", In Proceedings of ACM Queue, vol. 14, Jan. 2016, pp. 70-93.

Chandra, et al., "Hierarchical Scheduling for Symmetric Multiprocessors", In Journal of IEEE Transactions on Parallel and Distributed Systems, vol. 19, Issue 3, Mar. 2008, pp. 418-431.

Cho, et al., "On the Properties of Neural Machine Translation: Encoder-Decoder Approaches", In Repository of arXiv:1409.1259v1, Sep. 3, 2014, 9 Pages.

Feitelson, et al., "Utilization and Predictability in Scheduling the IBM SP2 with Backfilling", In Proceedings of the First Merged International Parallel Processing Symposium and Symposium on Parallel and Distributed Processing, Mar. 30, 1998, pp. 542-546.

Ghodsi, et al., "Choosy: Max-Min Fair Sharing for Datacenter Jobs with Constraints", In Proceedings of the 8th ACM European Conference on Computer Systems, Apr. 15, 2013, pp. 365-378.

Ghodsi, et al., "Dominant Resource Fairness: Fair Allocation of Multiple Resource Types", In Proceedings of 8th USENIX Conference on Networked Systems Design and Implementation, Mar. 30, 2011, pp. 1-14.

Gog, et al., "Firmament: Fast, Centralized Cluster Scheduling at Scale", In 12th USENIX Symposium on Operating Systems Design and Implementation, Nov. 2, 2016, pp. 99-115.

Grandl, et al., "Graphene: Packing and Dependency-Aware Scheduling for Data-parallel Clusters", In Proceedings of 12th USENIX Symposium on Operating Systems Design and Implementation, Nov. 2, 2016, pp. 81-97.

Grandl, et al., "Multi-Resource Packing for Cluster Schedulers", In Proceedings of the ACM SIGCOMM Computer Communication Review, vol. 44, Issue 4, Aug. 17, 2014, pp. 455-466.

Gu, et al., "Tiresias: A GPU Cluster Manager for Distributed Deep Learning", In Proceedings of 16th USENIX Symposium on Networked Systems Design and Implementation, Feb. 26, 2019, pp. 485-500.

He, et al., "Deep Residual Learning for Image Recognition", In Proceedings of the IEEE Conference on Computer Vision and Pattern Recognition, Jun. 27, 2016, pp. 770-778.

Hindman, et al., "Mesos: A Platform for Fine-Grained Resource Sharing in the Data Center", In Proceedings of 8th USENIX Conference on Networked Systems Design and Implementation, vol. 11, Mar. 30, 2011, pp. 1-14.

Isard, et al., "Dryad: Distributed Data-Parallel Programs from Sequential Building Blocks", In Proceedings of the 2nd ACM SIGOPS/EuroSys European Conference on Computer Systems, Mar. 21, 2007, pp. 59-72.

Isard, et al., "Quincy: Fair Scheduling for Distributed Computing Clusters", In Proceedings of the Acm Sigops 22nd Symposium on Operating Systems Principles, Oct. 11, 2009, pp. 261-276.

Jeon, et al., "Analysis of Large-Scale Multi-Tenant GPU Clusters for DNN Training Workloads", In Proceedings of USENIX Annual Technical Conference, Jul. 10, 2019, pp. 947-960.

Jeon, et al., "Multi-Tenant GPU Clusters for Deep Learning Workloads: Analysis and Implications", In Microsoft Research Technical Report (MSR-TR-2018-13), May 2018, 14 Pages.

Kingma, et al., "Stochastic Gradient VB and the Variational Auto-Encoder", In Proceedings of the International Conference on Learning Representations, Apr. 14, 2014, 14 Pages.

Krizhevsky, et al., "CIFAR-10 (Canadian Institute for Advanced Research)", Retrieved from: https://web.archive.org/web/20210125051132/https://academictorrents.com/details/463ba7ec7f37ed414c12fbb71ebf6431eada2d7a, Jan. 25, 2021, 2 Pages.

Li, et al., "Massively Parallel Hyperparameter Tuning", In Repository of arXiv:1810.05934v3, Nov. 29, 2018, 15 Pages.

Martin, et al., "A Database of Human Segmented Natural Images and its Application to Evaluating Segmentation Algorithms and Measuring Ecological Statistics", In Proceedings of the Eighth International Conference on Computer Vision, vol. 2, Jul. 7, 2001, pp. 416-423.

Merkel, Dirk, "Docker: Lightweight Linux Containers for Consistent Development and Deployment", Linux Journal, vol. 239, Mar. 1, 2014, 5 Pages.

Myers, et al., "How to Mount Blob Storage as a File System with Blobfuse", Retrieved from: http://web.archive.org/web/20210308132745/https://docs.microsoft.com/bs-latn-ba/azure/storage/blobs/storage-how-to-mount-container-linux, Feb. 1, 2019, 7 Pages.

Nisan, et al., "Algorithmic Game Theory", In Publication of Cambridge University Press, Sep. 24, 2007, 775 Pages.

Peng, et al., "Optimus: An Efficient Dynamic Resource Scheduler for Deep Learning Clusters", In Proceedings of the Thirteenth EuroSys Conference Pattern Recognition, Apr. 23, 2018, 14 Pages.

Picus, et al., "Word-Level Language Modeling RNN", Retrieved from: https://github.com/pytorch/examples/tree/master/word_language_model, Jul. 7, 2020, 3 Pages.

(56) References Cited

OTHER PUBLICATIONS

Popa, et al., "FairCloud: Sharing the Network in Cloud Computing", In Proceedings of the ACM SIGCOMM Conference on Applications, Technologies, Architectures, and Protocols for Computer Communication, Aug. 13, 2012, pp. 187-198.

Radford, et al., "Unsupervised Representation Learning with Deep Convolutional Generative Adversarial Networks", In Repository of arXiv:1511.06434v1, Nov. 19, 2015, 15 Pages.

Sergeev, et al., "Horovod: Fast and Easy Distributed Deep Learning in TensorFlow", In Repository of arXiv:1802.05799v3, Feb. 21, 2018, 10 Pages.

Shi, et al., "Real-Time Single Image and Video Super-Resolution using an Efficient Subpixel Convolutional Neural Network", In Proceedings of the IEEE Conference on Computer Vision and Pattern Recognition, Jun. 2016, pp. 1874-1883.

Vavilapalli, et al., "Apache Hadoop YARN: Yet Another Resource Negotiator", In Proceedings of the 4th Annual Symposium on Cloud Computing, Oct. 1, 2013, 16 Pages.

Waldspurger, Carl A., "Lottery and Stride Scheduling: Flexible Proportional-Share Resource Management", In Doctoral Dissertation, Massachusetts Institute of Technology, Sep. 1995, 151 Pages.

Waldspurger, et al., "Lottery Scheduling: Flexible Proportional-Share Resource Management", In Proceedings of the 1st USENIX Conference on Operating Systems Design and Implementation, Nov. 14, 1994, 11 Pages.

Xiao, et al., "Gandiva: Introspective Cluster Scheduling for Deep Learning", In Proceedings of 13th USENIX Symposium on Operating Systems Design and Implementation, Oct. 8, 2018, pp. 595-610.

Xie, et al., "Aggregated Residual Transformations for Deep Neural Networks", In Proceedings of IEEE Conference on Computer Vision and Pattern Recognition, Jul. 2017, pp. 1492-1500.

You, et al., "Large Batch Optimization for Deep Learning: Training BERT in 76 Minutes", In Proceedings of 8th International Conference on Learning Representations, Apr. 26, 2020, pp. 1-37.

Yu, et al., "DryadLINQ: A System for General-Purpose Distributed Data-Parallel Computing Using a High-Level Language", In Proceedings of the 8th USENIX Conference on Operating Systems Design and Implementation, vol. 8, Dec. 8, 2008, pp. 1-14.

"International Search Report and Written Opinion Issued in PCT Application No. PCT/US22/019214", Mailed Date Jun. 8, 2022, 9 Pages.

Lecun, et al., "The Mnist Database of Handwritten Digits", Retrieved from: http://yann.lecun.com/exdb/mnist/, Apr. 17, 2021, 7 Pages.

* cited by examiner

TRANSPARENT PRE-EMPTION AND MIGRATION FOR PLANET-SCALE COMPUTER

CROSS-REFERENCE TO RELATED APPLICATIONS

This application claims the benefit of India provisional application number 202141013182 filed on Mar. 25, 2021 and entitled "TRANSPARENT PRE-EMPTION AND MIGRATION FOR PLANET-SCALE COMPUTER", which is hereby incorporated by reference in its entirety for all intents and purposes.

BACKGROUND

Artificial intelligence (AI) innovations are predicated on highly scalable, performant, robust, and technically efficient AI infrastructure. Current methods of incrementally extending existing general-purpose infrastructure as a service (IaaS) and cloud-based environments have significant limitations as AI workloads are fundamentally different and necessitate purpose-built AI infrastructure. Managing the minutia of current infrastructure presents substantial challenges to data scientists trying to accelerate the algorithmic innovations of AI.

Today, an increasingly popular computing trend in the world of AI computing is the area of deep learning (DL). DL has already had significant impact on widely used personal products for voice and image recognition, and has significant potential to impact businesses. DL jobs represent a vital and growing set of computing workloads, especially in cloud data centers. But, like most AI models, DL jobs are compute-intensive and, hence, heavily reliant on powerful but expensive graphics processing units (GPUs). For instance, a GPU virtual machine (VM) in the cloud is more inefficient than a regular VM. Cloud operators and large companies that manage clusters of tens of thousands of GPUs rely on cluster schedulers to ensure efficient utilization of the GPUs. Despite the importance of efficient scheduling of deep learning training (DLT) jobs, the common practice today is to use a traditional cluster scheduler, such as Kubernetes or YARN, designed for handling big-data jobs such as MapReduce, which is a programming model and implementation for processing and generating big data sets.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects described herein are directed to a computerized method for providing checkpointing of a machine learning job, such as a DLT job, at one node in a cloud computing environment and resuming the DLT job from a checkpointed state on a different node. To do so, the GPU state of a GPU executing the DLT job is captured. The GPU state includes GPU data comprising model parameters and an optimizer state located in the GPU at the time of checkpointing. Additionally, a CPU state of a CPU executing the DLT job is also captured. The GPU and CPU states are stored in shared memory that is accessible by a proxy node, and a checkpointed state is defined, at least partially, by the GPU state and the CPU state in the shared memory. The DLT job may then be migrated to the destination node and resumed thereon using at the checkpointed state.

BRIEF DESCRIPTION OF THE DRAWINGS

The present description will be better understood from the following detailed description read in light of the accompanying drawings, wherein.

Corresponding reference characters indicate corresponding parts throughout the drawings.

DETAILED DESCRIPTION

Figure 1:
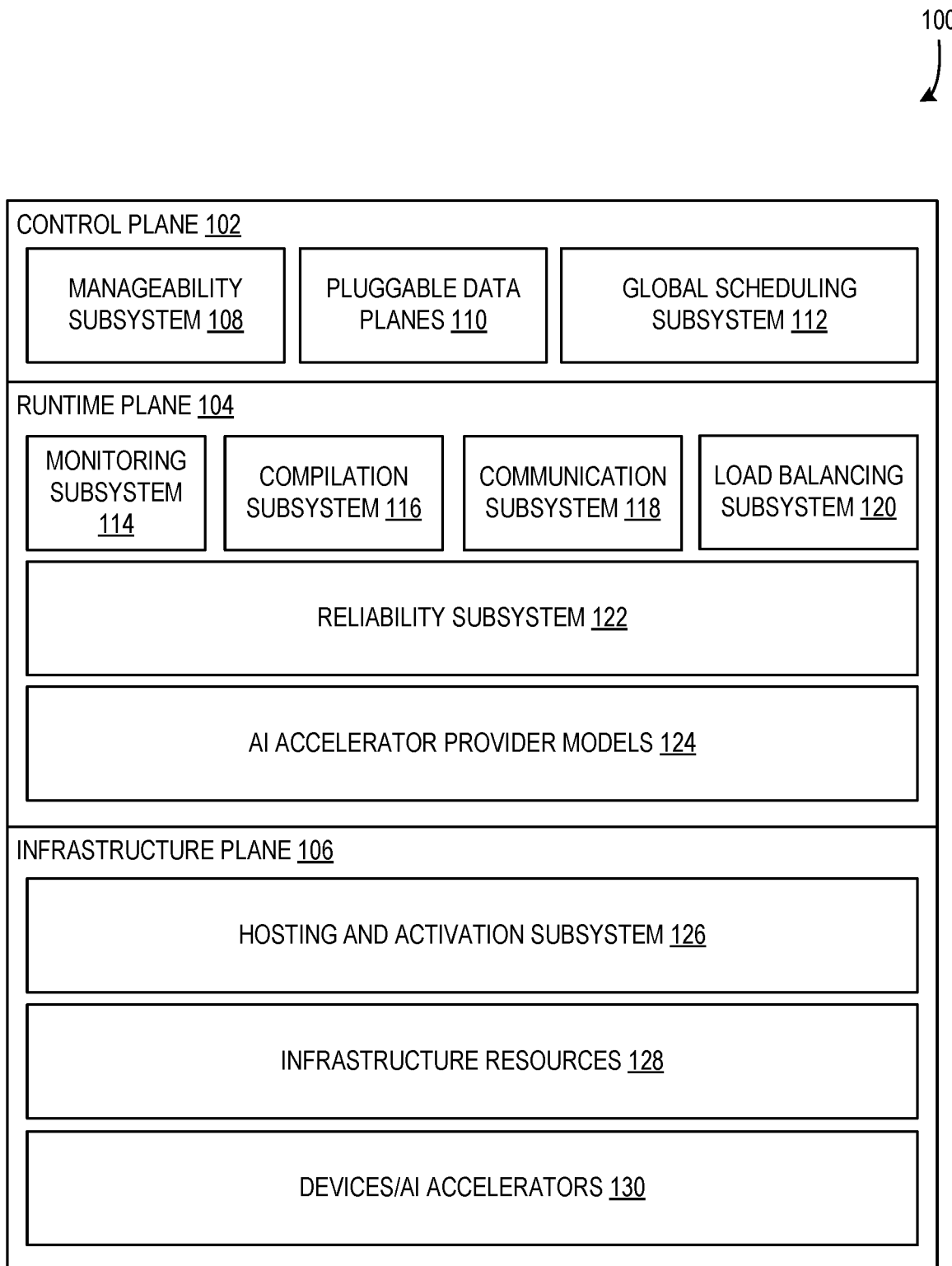
FIG. 1 is a block diagram illustrating a system configured for providing infrastructure service for artificial intelligence (AI) workloads.

The various implementations, examples, and embodiments are described in detail with reference to the accompanying drawings. Wherever possible, the same reference numbers will be used throughout the drawings to refer to the same or like parts. References made throughout this disclosure relating to specific examples, implementations, and embodiments are provided solely for illustrative purposes but, unless indicated to the contrary, are not meant to limit all examples.

This disclosure describes several implementations and examples for transparently and preemptively migrating deep learning training (DLT) jobs and inferences from one group of processing resources in the cloud to another. The disclosed examples and implementations provide checkpoints for given DLT jobs, using either a proxy process (or service) that stores the host client configurations and reconfigures the server-based configurations before moving the DLT jobs to a new group of resources or by implementing a barrier across multiple processing resources, such as central processing units (CPUs), graphics processing units (GPUs), application-specific integrated circuits (ASICs), quantum processors, virtual machines (VMs), or the like.

The disclosed examples provide a platform-level, domain-aware, iteration-level, on-demand checkpointing for DLT jobs to transparently preempt the DLT jobs, migrate them from node to node, and then continue processing the DLT jobs on new nodes. The implementations and examples provide transparent checkpointing and migration of DLT jobs across a large cloud environment, such as a global-scale infrastructure as a service (IaaS). The ability to checkpoint any DLT job and resume the DLT job from the same point on a different node is a key building block that enables several important features in an AI-centric IaaS. Such checkpointing, migration, and resumption provides automatic fault-tolerance for user jobs when machine or job failures happen. This is particularly important as DLT jobs are long-running (could last several hours, days or weeks).

The disclosed preemption and migration techniques enable effective utilization of preemptible resources (such as preemptible or spot VMs). Spot VMs are more technically efficient and enable some cloud operators to sell spare capacity. But long-running DLT jobs often cannot make progress under preemption unless they resume processing from the point at which they left after the restoration on another machine. Additionally, some of the implementations and examples enable a scheduler to transparently preempt and move the jobs or tasks across devices/machines, to perform de-fragmentation, dynamic load-balancing, live migration to handle upgrades, or auto-fit a job to the right GPU stock keeping unit (SKU) based on runtime profiling.

A DLT job is a machine-learning, big-data job that is allocated a set of GPUs at job startup and holds exclusive access to its GPUs until completion. While the disclosed examples are discussed in relation to DLT jobs and inferences, any kind of AI job may be migrated using the disclosed techniques, such as, for example but without limitation, a deep neural network (DNN) or "deep net" job. Such jobs may be long-running (e.g., processing for several hours or days or weeks or months). Moving jobs after they start processing potentially jeopardizes hours, days, or longer of processing time. The disclosed examples and implementations provide a way to move jobs to other processing resources in the cloud at the point in time in which the jobs are processing, eliminating the loss of any significant work.

Conventionally, there are two approaches to move a DLT job. One requires the developer who writes the script for the DLT job to actually write custom code for checkpointing. This code may be in the form of using very restrictive libraries or in the form of logic for what to do when a job is preempted and how to get it to the same state. This is fairly complicated for the programmer, which is why most DLT jobs today do not handle checkpointing or preemption. As a result, a scheduler cannot rely on this. Typically, only 5% of DLT jobs have checkpointing enabled, which is unreliable from the perspective of the technical performance expectations that a scheduler can provide.

Both of the above options place a significant restriction on the user writing the model. Not surprisingly, most models available publicly today do not perform any checkpointing. In contrast, the disclosed implementations and examples include platform-level support for checkpointing that handles any unmodified user code and transparently provides checkpoint-and-restore functionality, without a user having to worry about it.

Platform-level approaches for checkpointing are typically domain-agnostic and therefore brute-force. For example, checkpointing libraries requires checkpointing CPU applications, crawling the entire address space of the process and checkpointing the entire memory state, opening all file descriptors, etc. and then restoring them at the other end. Checkpointing libraries today do not support checkpointing of device state and a similar domain-agnostic approach in the case of DLT jobs is computationally expensive, because most jobs utilize the full memory on the GPU (~16 GB or 32 GB). However, because of the periodicity of memory usage in a DLT job, the GPU memory usage spikes at the end of the forward pass, because of activations, and then it gets back to a very low number—often 30-70 times lower from the peak after the activations are freed up at the end of the backward pass). The disclosed implementations and examples employ a domain-specific approach that takes advantage of this characteristic to time the checkpointing at the low-memory point, e.g., the end of a mini-batch. Because a mini-batch typically completes within a couple of seconds, the wait for the low-memory point is quite small.

To provide a more technically efficient framework, examples make preemption and migration the default for every DLT job of a large-scale cloud infrastructure. In some implementations and examples, every DLT job in the large-scale cloud infrastructure becomes inherently preemptable and migratable without the developer having to run or write anything special. As a result, users also do not have to do anything special to preempt or migrate a job. This is done by intercepting, at a low enough level, and checkpointing the process state of a DLT job in a way that the user program is not aware what is happening. In other words, it is transparent to the above software layers, both user code as well as framework libraries (e.g., PyTorch or TensorFlow). Because the disclosed examples work on DLT jobs written in Python, PyTorch, or TensorFlow, job migration is possible.

Unlike traditional programs, DLT jobs frequently use GPUs, and GPU states are not easy to migrate. There are different libraries for checkpointing programs running in CPUs. Aspects of the disclosure are operable with any functionality that enables checkpointing of an entire CPU address space. These checkpointing libraries have the ability to checkpoint a process, move it to a new machine, and start it. But these checkpointing libraries do not work for GPUs because they have a lot of proprietary states that are embedded in the GPU that are not understood by the checkpointing.

The disclosed examples checkpoint the client process and restructure it in such a way so that the server process is stateless. Then, the server process may be stopped, in which case the job is migrated to another server node. When the server process is brought up at the other server node, the server process can be recreated. To bring the server process up to speed, some implementations and examples log calls to the GPU to recreate the same state of the GPU at the new server node. Also, before the initial server is disabled, some examples capture the memory of the initial server so that the same memory may be recreated at the new server node. For example, the server may be copied to disc, and then the same pointers may be allocated to the new server. The disclosed examples therefore allow useful state to be copied from the client, the GPU state to be copied from the server, and then only the useful client state is checkpointed, and the server process is recreated. The sequence may then continue at the new server node.

Having generally and specifically described some implementations and examples, attention is directed to the accompanying drawings to provide further clarity.

FIG. 1 is a block diagram illustrating a system 100 configured for providing infrastructure service for AI workloads according to an embodiment. The system 100 includes a control plane 102, a runtime plane 104, and an infrastructure plane 106. In some examples, the system 100 is a distributed computing infrastructure system that includes hardware devices distributes across many different locations (e.g., a global or planet-scale distributed system). Further, the system 100 is configured specifically to enable the execution of AI workloads, such that the hardware, firmware, and/or software of the system 100 is configured to enable technically efficient execution of tasks associated with AI workloads. Alternatively, or additionally, the system 100 may include hardware, firmware, and/or software configured specifically to enable the execution of other types of workloads without departing from the description.

The control plane 102 includes a manageability subsystem 108, pluggable data planes 110, and a global scheduling subsystem 112. In some examples, the control plane 102 is configured to receive or accept AI workloads and associated data through a variety of extensible or pluggable data planes 110 that may be defined by the tenants of the system (e.g., plugging in an alternate data plane below the scheduler to support Kubernetes or another similar system running in a tenant's private data center). Those AI workloads are scheduled for execution on the infrastructure of the system 100 (e.g., the infrastructure plane 106), as described herein.

The manageability subsystem 108 includes hardware, firmware, and/or software configured to provide interactive processing of AI workload requests to tenants. Further, the manageability subsystem 108 is configured to provide all infrastructure resources of the system 100 in all regions of the system's operation. In some examples, the manageability subsystem 108 includes manageability replicas in various regions of the system 100 such that the infrastructure resources of the system 100 are multi-mastered by various replicas as an interface between tenants and the system 100. The manageability subsystem 108 may be decoupled from the global scheduling subsystem 112.

The global scheduling subsystem 112 includes hardware, firmware, and/or software configured to schedule AI workloads/jobs for execution on the infrastructure resource of the system 100 as described herein. In some examples, the global scheduler subsystem 108 includes hierarchical schedulers: global scheduler(s), regional schedulers, and coordinator services. The global scheduler is responsible for preparing schedules corresponding to the AI workloads (e.g., jobs, models, and/or pods) and handing them over to the regional schedulers based on those prepared schedules. The regional scheduler is responsible for managing and reporting regional capacity with the global scheduler and then also executing schedule received from the global scheduler. The coordinator service is responsible for translating the schedules into physical resource allocations across clusters of infrastructure resources within a region. The coordinator service may also constitute or otherwise be closely associated with the reliability subsystem 122 as described herein. The global scheduling subsystem 112 is described in greater detail below.

The runtime plane 104 includes subsystems configured to enable the AI workloads to be distributed to and executed on the infrastructure plane 106 as described herein. Such subsystems may include a monitoring subsystem 114, a compilation subsystem 116, a communication subsystem 118, and/or a load balancing subsystem 120. Further, the runtime plane 104 includes a reliability subsystem 122 configured for securing the reliability of execution of AI workloads while enabling such workloads to be checkpointed and/or migrated throughout the infrastructure resources of the system 100. The runtime plane 104 further includes AI accelerator provider models 124 that are configured to enable the use of a variety of libraries and/or configurations for managing AI accelerators when executing AI workloads. The runtime plane 104 is described in greater detail below.

The infrastructure plane 106 includes hardware, firmware, and/or software for executing the AI workloads based on the schedules provided by the control plane 102 and instructions received from the runtime plane 104. The infrastructure plane 106 includes hosting and activation subsystems 126, infrastructure resources 128, and devices/AI accelerators 130. The infrastructure plane 106 is described in greater detail below.

Figure 2:
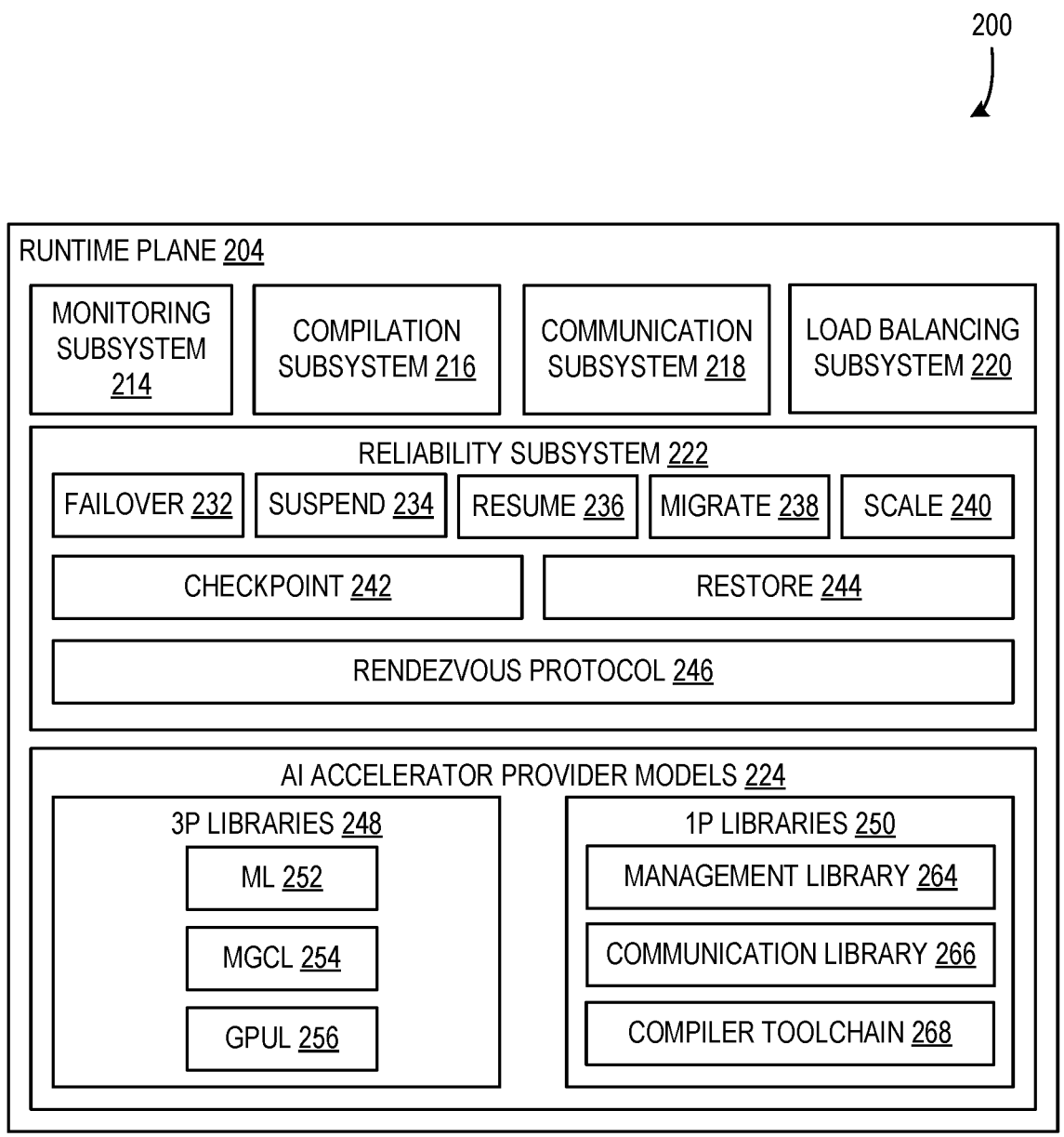
FIG. 2 is a block diagram illustrating a runtime plane of the system of FIG. 1.

FIG. 2 is a block diagram 200 illustrating a runtime plane 204 of the system 100 of FIG. 1 according to an embodiment. In some examples, the runtime plane 204 is substantially the same as the runtime plane 104 described above with respect to FIG. 1. The runtime plane 204 includes a monitoring subsystem 214, a compilation subsystem 216, a communication subsystem 218, a load balancing subsystem 220, a reliability subsystem 222, and AI accelerator provider models 224.

The reliability subsystem 222 includes routines for interacting with AI workloads to ensure their reliability. In some examples, the routines include failover 232, suspend 234, resume 236, migrate 238, scale 240, checkpoint 242, and restore 244. The checkpoint 242 and restore 244 routines may be configured as the core routines and the other routines (failover 232, suspend 234, resume 236, migrate 238, and scale 240) may be configured to use checkpoint 242 and/or restore 244 routines to achieve the desired results.

The checkpoint 242 routine is configured to save the state of an AI workload as it is executed, such that the saved state can be used to continue execution of the AI workload from the saved point in time. Checkpoint 242 may be used to perform the suspend 234 routine to halt the execution of an AI workload for a period of time and/or to perform the migrate 238 routine to save the state of the AI workload such that it can be moved to another set of infrastructure resources for continued execution.

The restore 244 routine is configured to take a saved state of an AI workload as input and restore the execution of the AI workload on infrastructure resources starting at the point of the saved state. The restore 244 routine may be used to perform the resume 236 routine and/or to restore the execution of an AI workload that has been migrated to another set of infrastructure resources based on a migrate 238 routine.

The failover 232 routine is configured to checkpoint the state of an AI workload based on detection of a failure of the current infrastructure resources and to restore the AI workload on a new set of infrastructure resources, such that the AI workload recovers from the detected failure.

The scale 240 routine is configured to scale up and/or scale down the quantity, quality, and/or type of infrastructure resources being used to execute an AI workload. For instance, if additional infrastructure resources are available, an AI workload may be scaled up to make use of those additional infrastructure resources. Alternatively, if a new AI workload requires some infrastructure resources in use executing a current AI workload, the current AI workload may be scaled down to free up some resources for the new AI workload (e.g., the new AI workload may be associated with a higher priority or tier than the current AI workload).

The reliability subsystem 222 further includes a rendezvous protocol 246 configured to synchronize or otherwise enforce synchronization on AI workloads upon which the above-described routines are to be applied. For instance, if an AI workload is going to be migrated, the rendezvous protocol 246 is configured to synchronize the operations of the system such that the resources involved in the migration are not altered during the migration process. Such a rendezvous protocol 246 may include use of locking or forming a barrier such that processes that are otherwise not associated with the migration do not affect the migration inadvertently.

The AI accelerator provider models 224 are configured to enable the use of various software stacks, including third-party (3P) libraries 248 (e.g., libraries provided by tenants of the system 100) and/or first-party (1P) libraries 250 (e.g., libraries provided by the entity that manages the system 100). For instance, 3P libraries 248 may include a 3P-specific management library (ML) 252, 3P-specific multi-GPU communications library (MGCL) 254, and 3P-specific GPU library 256. Additionally, or alternatively, 1P libraries 250 may include a management library 264, a communication library 266, and/or a compiler toolchain 268. The runtime plane 204 enables tenants to make use of a wide variety of software stacks and associated libraries, including their own software stacks, to execute AI workloads within the described system 100 based on its extensible, flexible configuration.

Figure 3:
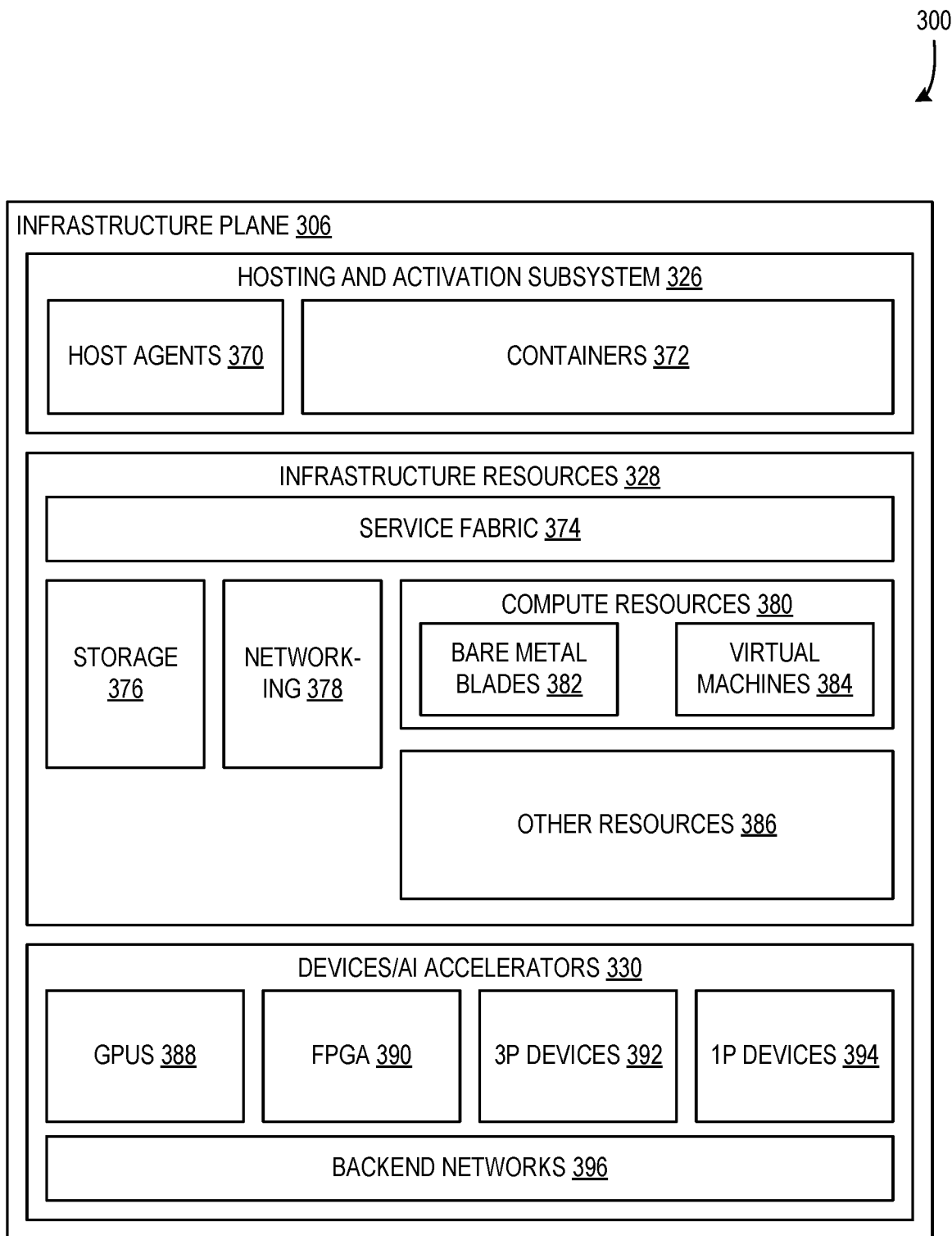
FIG. 3 is a block diagram illustrating an infrastructure plane of the system of FIG. 1.

FIG. 3 is a block diagram 300 illustrating an infrastructure plane 306 of the system 100 of FIG. 1 according to an embodiment. In some examples, the infrastructure plane 306 is substantially the same as the infrastructure plane 106 of FIG. 1, as described above. The infrastructure plane 306 includes a hosting and activation subsystem 326, infrastructure resources 328, and devices and AI accelerators 330.

The hosting and activation subsystem 326 includes host agents 370 and containers 372. The host agents 370 enable and organize the hosting of AI workloads on the infrastructure resources 328. The containers 372 (e.g., copy-on-write containers) keep different AI workloads (e.g., workloads from different tenants) separate and secure from each other, even when they are being executed on the same host. A host controlled by a host agent 370 may be a device that includes a set of infrastructure resources 328 that are configured to execute an AI workload or at least a portion thereof. Thus, by separating AI workloads into containers 372, some resources of a host may be used to execute an AI workload from one tenant, while other resources of the host may be used to execute an AI workload of another tenant at the same time. The containers 372 are configured such that the two separated AI workloads are prevented from interacting in any manner while they are being executed.

The infrastructure resources 328 include a service fabric 374 interface, storage resources 376, networking resources 378, compute resources 380 which may include bare metal blades 382 (e.g., physical processing devices) and virtual machines 384, and other resources 386 (e.g., integration infrastructure resources). In some examples, the infrastructure resources 328 are primarily provided for use by the entity that is offering services of the system 100 (e.g., 1P resources), but in other examples, the infrastructure resources 328 may also include resources provided by other entities (e.g., 3P resources) such as resources owned and used by tenants of the system 100. Such integration may be enabled via the 3P libraries 248 and other configurations described above.

The devices and AI accelerators 330 include GPUs 388, FPGA devices 390, other 3P devices 392, and other 1P devices 394. The described processes may further be enabled by backend networks 396 and/or associated devices. The execution of AI workloads may uniquely benefit from the use of GPUs 388, FPGAs 390, and/or other specialized hardware. In such examples, infrastructure resources 328, such as compute resources 380, may be linked to GPUs 388, for instance, such that a compute resource 380 provides instructions to the GPU 388 for how to execute steps of the AI workload. Such execution then takes advantage of specialized architecture of the GPU 388, such as the GPU 388 having many cores enabling parallel processing of data to a significant degree beyond the capabilities of the compute resources 380.

The backend networks 396 are configured to support a variety of non-uniform backend network architectures that may be envisioned by a variety of entities that use the system, such as 1P and 3P hardware manufacturers. Such backend networks 396 may be used to provide links between disaggregated topologies of compute nodes (e.g., compute resources 380) and hardware accelerators (e.g., GPUs 388).

Figure 4:
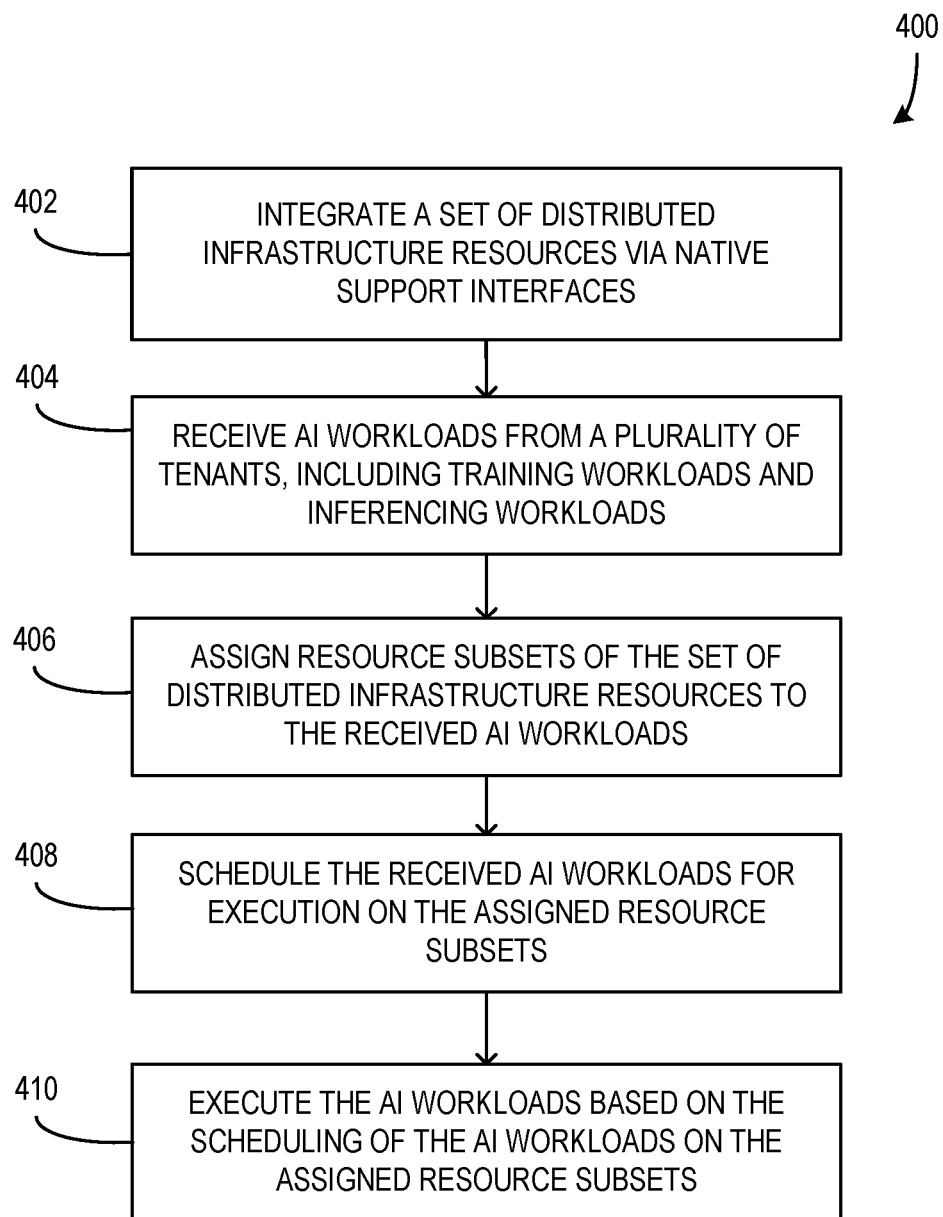
FIG. 4 is a flowchart illustrating a method for managing AI workloads in a cloud infrastructure platform.

FIG. 4 is a flowchart illustrating a method 400 for managing AI workloads in a cloud infrastructure platform according to an embodiment. In some examples, the cloud infrastructure platform of method 400 is a system such as system 100 of FIG. 1. At 402, a set of distributed infrastructure resources (e.g., hosting and activation subsystems 126, infrastructure resources 128, and/or devices/AI accelerators 130 of the infrastructure plane 106) are integrated into the cloud infrastructure platform via native support interfaces of those resources. In some examples, the native support interfaces may include interfaces and/or libraries of the providers of the resources, such as the 3P libraries 248 and 1P libraries 250 of FIG. 2. For instance, a tenant of the could infrastructure platform may provide a subset of infrastructure resources for integration into the platform based on provided libraries, such that the tenant and/or other tenants of the platform may use those resources in execution of AI workloads.

At 404, AI workloads are received from a plurality of tenants, wherein the received AI workloads include training workloads and inferencing workloads. In some examples, the tenants provide AI workloads for execution on the platform via interfaces such as pluggable data planes 110 as described herein.

At 406, resource subsets of the distributed infrastructure resources are assigned to the received AI workloads. In some examples, the assignment of resource subsets to the AI workloads is performed by a global scheduling subsystem 112 as described herein. Assigning the resources may include determining resource requirements of an AI workload and then identifying a subset of infrastructure resources that satisfy those requirements (e.g., an AI workload that requires the use of four GPUs in parallel may be assigned to a node of the system that has at least four GPUs).

Additionally, or alternatively, the assignment of a subset of resources to an AI workload may include rearranging of other AI workloads with respect to the subset of resources. For instance, assigning a resource subset to an AI workload may include saving a state checkpoint of an AI workload that is currently being executed on a first resource subset, migrating that AI workload to a second resource subset, restoring the saved state checkpoint of the migrated AI workload on the second resource subset, and then assigning at least a portion of the first resource subset to another AI workload. In some examples, such processes may be performed using routines of a reliability subsystem 222 as described herein.

At 408, the received AI workloads are scheduled for execution on the assigned resource subsets. In some examples, a global scheduling subsystem 112 generates a schedule for the AI workloads as described herein. Further, scheduling the execution of the AI workloads may include scheduling training workloads and inferencing workloads on the same infrastructure resources and those two types of workloads are multiplexed on those infrastructure resources (e.g., execution of a training workload is interspersed with execution of an inferencing workload on an infrastructure resource, such as a GPU).

Further, in some examples, AI workloads are associated with priorities or tiers that affect how resources are assigned and how AI workloads are scheduled to be executed on those resources. For instance, lower tier AI workloads may be more likely to be migrated to other resources to make space for higher tier AI workloads or higher tier AI workloads may be scheduled for a greater share of resource usage time than lower tier AI workloads, as described herein.

At 410, the AI workloads are executed based on the scheduling of the AI workloads on the assigned resource subsets. In some examples, the AI workloads are hosted in a hosting and activation subsystem 126 and then infrastructure resources 128 and/or devices/AI accelerators 130 are used to execute the AI workloads. For instance, assigning and executing AI workloads on resource subsets includes isolating the AI workloads from each other in secure containers, whereby AI workloads associated with different tenants are securely executed alongside each other (e.g., on resources associated with the same server).

Further, in some examples, executing AI workloads are monitored based on the performance of the cloud infrastructure platform and, based on that monitoring, the scheduling of the AI workloads is adjusted. The adjusting of the scheduling may include preempting an AI workload, migrating an AI workload, scaling up an AI workload, scaling down an AI workload, and/or load-balancing between two or more AI workloads. Such schedule adjustment may be performed by a global scheduling subsystem 112 or other component of the system 100.

Figure 5:
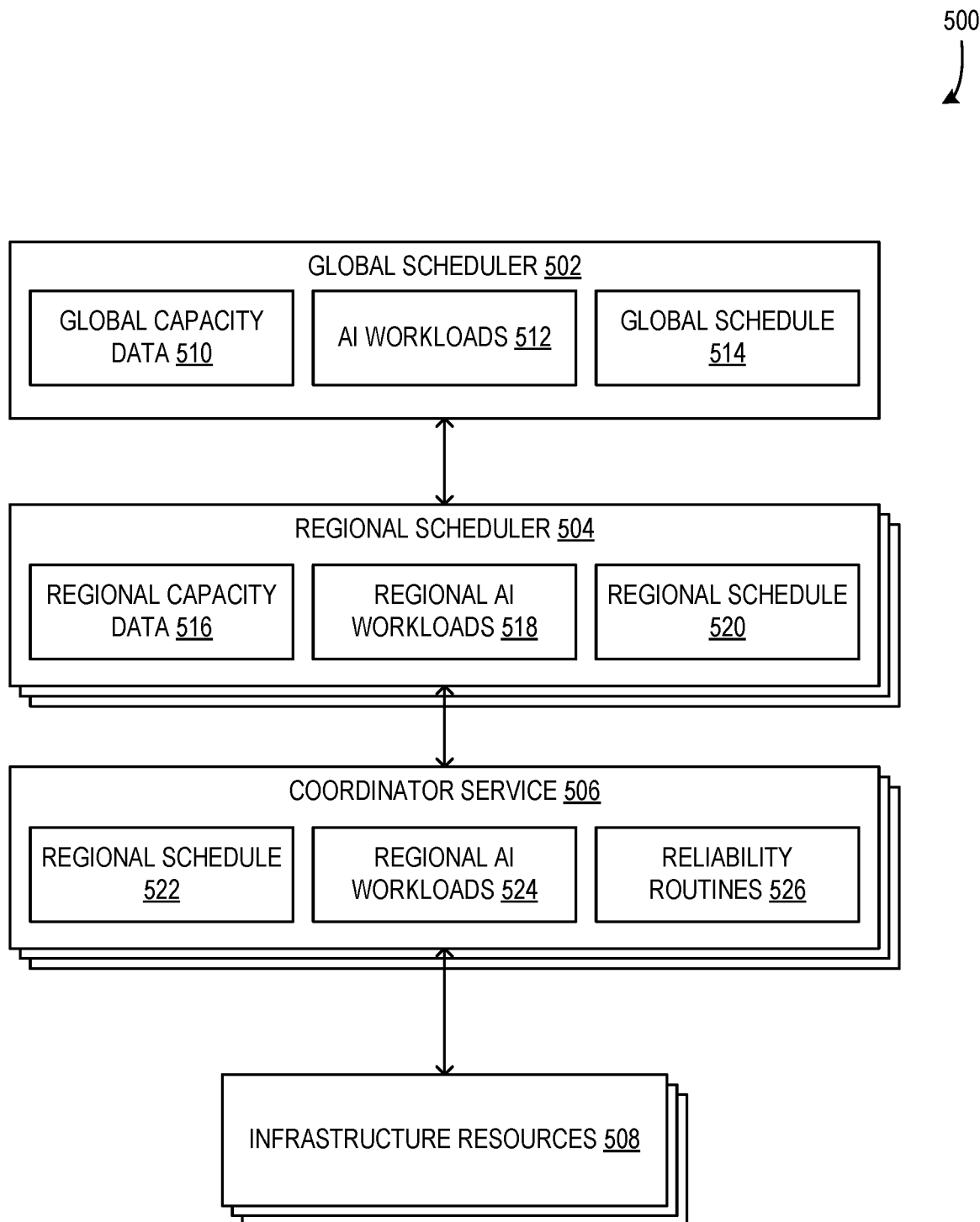
FIG. 5 is a block diagram illustrating a hierarchical scheduling subsystem configured for scheduling AI workloads.

FIG. 5 is a block diagram illustrating a hierarchical scheduling subsystem 500 configured for scheduling AI workloads 512 according to an embodiment. In some examples, the scheduling subsystem 500 is included in a system such as system 100 of FIG. 1. For instance, the scheduling subsystem 500 may be substantially the same as the global scheduling subsystem 112 of FIG. 1. The scheduling subsystem 500 includes a global scheduler 502 and multiple regional schedulers 504, coordinator services 506, and associated infrastructure resources 508. The global scheduler 502 is configured to use the global capacity data 510 (e.g., data indicating the current state of resource usage throughout the associated global infrastructure system, including resource usage in each region of the system) and AI workloads 512 to generate a global schedule 514 that schedules the AI workloads 512 to be executed on the infrastructure resources 508. The global scheduler 514 includes regional schedules 520 for each region of the system, which are then provided to the regional schedulers 504 associated with those regions (e.g., a regional scheduler 520 of a region is provided to the regional scheduler 504 associated with that particular region).

The regional schedulers 504 monitor the current regional capacity data 516 of the infrastructure resources 508 associated with the respective regions and that regional capacity data 516 is provided to the global scheduler 502 periodically or based on a pattern or a triggering event. Further, the regional schedulers 504 receive the regional AI workloads 518 associated with their regions from the global scheduler 502 from the set of AI workloads 512. The regional schedulers 504 are also configured to instruct the coordinator services 506 to execute the associated regional schedules 520 using the data of the regional AI workloads 518 (each region includes a regional scheduler 504 and a coordinator service 506).

The coordinator services 506 are configured to receive a regional schedule 522 and associated regional AI workloads 524 from an associated regional scheduler 504 and to use the reliability routines 526 (e.g., the routines of the reliability subsystem 222 of FIG. 2 as described above) to cause the regional AI workloads 524 to be executed using infrastructure resources 508 of the region based on the regional scheduler 522. For instance, a coordinator service 506 may be configured to allocate a subset of infrastructure resource 508 of the region to a regional AI workload 524 and cause that workload 524 to be executed on those allocated resources 508. Additionally, or alternatively, a coordinator service 506 may be configured to checkpoint, restore, migrate, and/or perform other reliability routines 526 to arrange the use of the infrastructure resources 508 according to the regional schedule 522.

A DLT job cannot be modified. So the disclosed implementations and examples, instead, resume training of a given DLT job in the same state on a different node as it was during checkpointing on an original node running the DLT job (e.g., the same PC/instruction pointer, the same register state, call stack, etc.). The disclosed implementations and examples save the program state of the DLT job and restore the DLT job at that program state on another node of the cloud environment, switching the execution/control flow to the same instruction.

In some implementations and examples, checkpointing libraries perform checkpointing of the entire CPU address space (e.g., domain-agnostic) and restores the CPU address space on the destination node, using, for example, a checkpoint service 600 discussed below and shown in FIG. 6. Because the CPU address footprint of most DLT and DNN jobs is minimal—because most states reside in the GPU—dumping the entire address space is not too computationally expensive (e.g., 1-2 GB per task). Assuming a domain-specific approach for capturing only the relevant GPU state, some implementations and examples copy the active GPU state to the host (CPU) memory, and then checkpoint the entire address space. After restoring, some implementations and examples copy back the active GPU buffers back to the GPU memory on the destination node.

Figure 6:
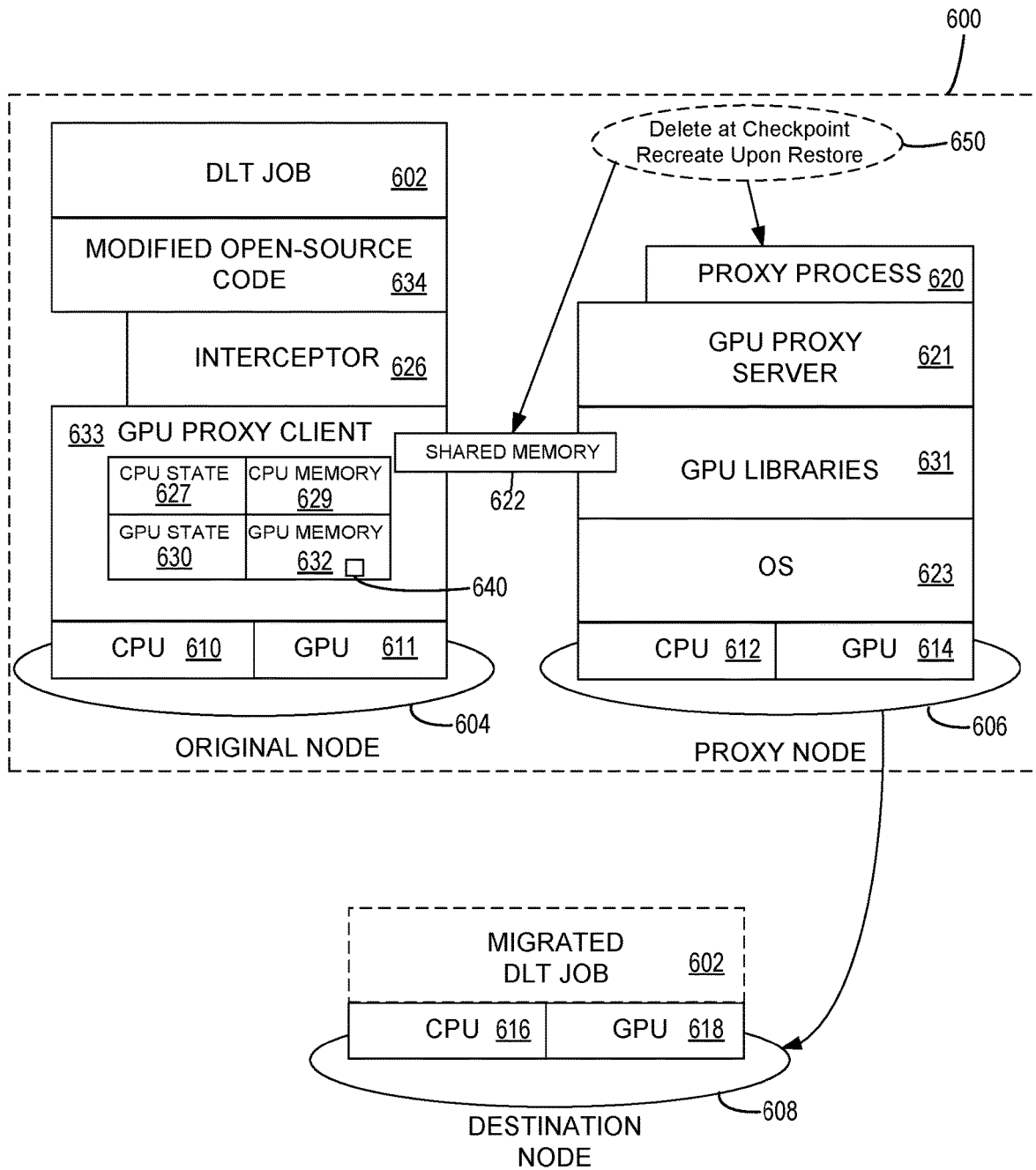
FIG. 6 is a block diagram illustrating a proxy-based dual-process architecture configured for checkpointing various operational parameters of a DLT job so that the DLT job may be migrated from an original node to a separate destination node.

FIG. 6 is a block diagram illustrating a checkpoint service 600 configured for checkpointing various operational parameters of a DLT job 602 so that the DLT job 602 may be migrated to a separate destination node 608. The checkpoint service 600 may also be referred to as a proxy-based dual-process (PBDP) architecture. "Proxy-based dual-process architecture" and "checkpoint service" are used synonymously in some examples herein.

The original node 604 includes one or more CPUs 610, the proxy node 606 includes one or more CPUs 612 and GPUs 614, and the destination node 608 includes one or more CPUs 616 and GPUs 618. The disclosed embodiment references different nodes, the original node 604, the proxy node 606, and destination node 608. These nodes 604-608 may be any type of server, computer, VM, or the like. Example computing devices that may function as each of the original node 604, the proxy node 606, and destination node 608 are discussed in FIG. 10 below as computing device 1000.

The original node 604 operates a processing layer that includes the DLT job 602, modified open-source code 634, an interceptor 626, a GPU proxy client 633, a CPU 610, and a GPU 611. The GPU proxy client 633 captures and stores CPU state 627, CPU memory 629, GPU state 630, and GPU memory 632 of the DLT job 602.

The proxy node 606 operates a processing layer for checkpointing the DLT job 602, including a proxy process 620, a GPU proxy server 621, various GPU libraries 631, a VM or server operating system (OS) 623, a CPU 610, and a GPU 611.

The destination node 608 includes a CPU 616 and a GPU 618, and is the destination for the migrated DLT job 602 after checkpointing.

As referenced below, various checkpointed parameters of the DLT job 602 are stored in the shared memory 622 that is accessible by the proxy node 606. This shared memory 622 may be temporarily stored. As shown by dotted ellipse 650, the shared memory 622 captures various checkpointed parameters of the DLT job 602 and restores those parameters on the proxy node 606. Once restored on the proxy node 606, the captured parameters for the DLT job 602 may be deleted and removed from the original node 604. Then, the DLT job 602 may be moved to the destination node 608 using the checkpointed and restored parameters.

The GPU proxy client 633 captures and stores CPU state 627, CPU memory 629, GPU state 630, and GPU memory 632 of the DLT job 602.

In some implementations and examples, checkpointing of the DLT job 602 at one node (the original node 604) of a cloud computing environment is done and the DLT job 602 is resumed from a checkpointed state on a different node (the destination node 608). This may be schedule by the global scheduler 502, regional scheduler 504, coordinator service 506, or some other migration service in the cloud computing environment.

As described previously, checkpointing libraries handle CPU state, but fail when the address space is polluted with GPU-related state. The disclosed checkpoint service 600 resolves this conflict. In some implementations and examples, all GPU-related activity of the DLT job 602 is isolated in a proxy process 620 at a separate proxy node 606 that is located at a different address space than the original node 604 while the DLT job 602 is being processed (e.g., the user's Python code with a PyTorch/TensorFlow (PT/TF) training loop, etc.).

The proxy process 620 is implemented in executable code, firmware, hardware, or a combination thereof and is designed to be stateless across checkpoints. As a result, the address space of the proxy process 620 is polluted with the above GPU-related mappings, but because it is stateless, implementations and examples are able to delete (or kill) and restart the proxy process at the destination node 608. The main process address space (which is the useful, stateful part) of the DLT job 602 remains without any GPU-related state and can thus be safely checkpointed.

Some examples capture the GPU state 630 and the GPU memory 632 of the GPU 611 during executing the DLT job 602 on the original node 604. The GPU state 630 may include GPU data comprising model parameters and an optimizer state located in the GPU at the time of checkpointing. Additionally, the CPU state 627 and the CPU memory 629 of the CPU 610 is captured on the DLT job 602 on the original node 604. The CPU state 627, CPU memory 629, GPU state 630, and GPU memory 632 may be stored in the shared memory 622 and made accessible to the proxy node 606. Checkpointing for the DLT job 602 may then be performed using the CPU state 627, CPU memory 629, GPU state 630, and GPU memory 632, in some examples. Other examples use different or additional parameters, as discussed in more detail below. After checkpointing, the DLT job 602 may be migrated to the destination node 608 and the processing of the DLT job 602 resumed from a checkpointed state defined by one or more of the CPU states 627, CPU memory 629, GPU state 630, and GPU memory 632.

Additionally or alternatively, some of the disclosed examples capture a "checkpoint state" comprising model parameters that are written to memory, SSD, hard disks, or the like during checkpointing, and this checkpoint state is read during restore on the destination node 608. Additionally, GPU function call parameters are shared between original node 604 and the proxy node 606 that is read and written in shared memory between the two, and accessed continuously when a DLT job 602 is running.

Some examples isolate GPU-related activities of the GPU proxy client 633 or the GPU 611 into the proxy process 620 of the proxy node 606 that has a different address space than the GPU 611 of the original node 604. The proxy process 620 is stateless across checkpoints, in some implementations and examples, resulting in an address space of the proxy process 620 being polluted with GPU-related mappings. An address space of the proxy process 620 may be polluted with GPU-related mappings, but because the proxy process 620 is stateless, the proxy process 620 is able to be deleted (killed) and restarted at the destination node 608. Though, the main process address space of the proxy node 606 may be kept clean without any GPU-related state.

Additionally or alternatively, the GPU proxy server 621 may be configured to read model parameters of the DLT job 602 from the shared memory 622 and execute corresponding GPU calls in an address space of the proxy process 620. Also, return values may be transmitted, or shipped, back to the GPU proxy server 621 (which may also be considered a proxy client) through the shared memory 622.

Additional examples isolate GPU-related activity of the DLT job 602 across a first plurality of original node in the cloud computing environment into a separate proxy process. During the isolation, the DLT job 602 may be allowed to continue computation in a main process, and the computation may be done through execution of Python code and/or a PT/TF training loop.

In some examples, only a portion of the GPU memory 632 or the CPU memory 629 that is active is captured. For example, the portion of the GPU memory 632 containing model parameters of the DLT job 602 may be captured.

In some examples, a program state associated with the DLT job 602 is saved int eh shared memory 622. The program state may be used to restore the DLT job 602 on the destination node 608 through switching a control flow to the saved program state.

In order to move GPU-related activity into shared memory 622 of the proxy node 606, some implementations and examples use dynamic library interposition on all GPU-related calls of the DLT job 602. These GPU-related calls get intercepted in the main process of the DLT job 602 by the proxy node, which serializes the parameters, and writes the GPU-related calls into shared memory 622 between the original node and the proxy node 606. The proxy node 606 then reads these function parameters from the shared memory 622 and executes the corresponding GPU calls in its own address space, and ships back the return values to the main host process (the proxy client) back through the shared memory 622.

This checkpointing mechanism implemented by the checkpoint service 600 is domain-aware in that it identifies the specific parts of GPU memory 632 that hold useful data for checkpointing and migration, and copies over only those parts to the CPU memory before initiating a checkpoint.

This is crucial to keeping the size of the checkpoint manageable (as otherwise, the entire GPU address space would need to be copied (e.g., 16 GB or 32 GB per device). However, in order to have this capability, embodiments have visibility into all of the allocations/free events happening at the framework level (e.g., PyTorch).

Memory allocators in PyTorch and TensorFlow typically allocate the entire GPU memory at startup (by performing a Malloc( )) operation, and then manage this "device heap" through their memory allocators. Instead, the default memory allocator in PyTorch or TensorFlow is overridden with a unique allocator, giving the visibility into which regions are allocated or free. While such overriding is easy in TensorFlow (which provides extensibility points to override the memory allocator), PyTorch does not have a clean interface for the override, so the framework is changed to accommodate this.

In some implementations and examples, the current memory usage of the DLT job 602 is captured on the original node 604 by an interceptor 626 on the original node 604. The memory usage of the DLT job 602 is increased during the forward migration to the destination node 608 and reduced at the end of the backward pass. Without having semantic visibility into the structure or code of the model of the DLT job 602, the checkpoint may be timed at a point when the memory usage is close to the minimum (e.g., within 10% of the minimum). It should be noted that this is a performance optimization and is not needed for correctness in all implementations and examples. The low-memory condition is thus orthogonal to the issue of correctness in distributed DLT jobs 602, as it can be used as an additional constraint for technically efficient checkpointing, after the correctness constraint (e.g., flushing out pending all reduces) is met.

The interception approach of shipping GPU-related calls to a different address space brings with it several challenges. As the interaction with the proxy process 620 is in the critical path of GPU kernel dispatch (which is latency sensitive), the synchronization mechanism between the main process on the original node 604 and the proxy process 620 is low latency (e.g., without sleep, wakeup, etc.). To achieve this, the proxy process 620 waits on the shared memory 622, and when a particular "packet" (or a function invocation) is written, the proxy process 620 de-queues and executes the packet. For typical DLT workloads, the overhead of going through the proxy process 620 showed to be approximately 1-2% in some instances, but the overhead may be reduced further using the techniques discussed herein.

In some implementations and examples, the interceptor 626 intercepts calls of the DLT job 602, forwards the intercepted calls, stores those calls in the shared memory 622, and forwards those calls to lower-level GPU libraries 631 running on the proxy node 606. Low-level libraries, such as the GPU driver Application Programming Interface (API) and GPU runtime API are intercepted (at least partially), but they only have a limited set of APIs. Additionally, several libraries at the higher level, such as, for example but without limitation, open-source libraries Thrust, Eigen, Apex, or the like may be accessed (shown as modified open-source code 634) and used by the DLT job 602. These libraries are captured in some implementations and examples and added, or at least referenced, in the shared memory 622.

In addition, the DLT job 602, or a user model, may define its own kernels (custom kernels) that are launched directly on the GPU proxy client 633 of the original node 604 and added to the shared memory 622. As all these libraries may be launching custom kernels directly on the GPU, a naive approach would require intercepting all these libraries, which is unmanageable. Some examples intercept only a small set of low-level libraries. Higher level libraries such as Apex, or model-level libraries defining user-defined kernels, all interact with the GPU through the LaunchKernel or LaunchKernel APIs, so in some implementations and examples, a LaunchKernel call is intercepted and forwarded to the proxy node 606. The proxy node 606 serializes parameters of the LaunchKernel and copies them to the shared memory 622.

The checkpoint service 600 isolates the host address space of the original node 604 from direct device mappings and GPU-related pollution, but the PyTorch or TensorFlow process of the DLT job 602 running in the host address space of the original node 604 retains pointers to the GPU state 630 stored in the GPU proxy client 633 device state. For example, a tensor object in PyTorch may have a device pointer, which points to a GPU memory 632 of the original node 604. Similarly, a CPU variable may hold a "handle identifier" returned by a GPU call that ran on the GPU proxy client 633. When this address space is resumed on the GPU 618 of the destination node 608, such virtual pointers continue to be valid and have the same meaning.

Objects in the host address space of the original node 604 (such as Tensor objects) hold pointers to device memory. The host process on the DLT job 602 may not directly de-reference or interpret these pointers. Instead, these pointers are stored in the shared memory 622 and shipped to the proxy node 606 as parameters to kernels, and it is kernel code (running in the GPU 618) that interprets these pointers. Nevertheless, implementations and examples ensure that these pointers point to the same objects as they were pointing to in the old GPU of the original node 604 before the checkpoint.

In some implementations and examples, checkpoint service 600 is controlled allowing just a single allocation of device memory through Malloc. Some implementations and examples intercept the mmap that Malloc performs (e.g., through the LD_PRELOAD mechanism) and forces the mapping to be performed at a stable address (which is the same across GPUs 614 and 618). By default, the mmap specifies NULL in the desired address, which means an OS 623 of the proxy node 606 maps it to some arbitrary region in the address space. The virtual address to which the mapping is done, ensuring that the starting address of the Malloc is the same across all GPUs. Active regions of the GPU state 630 of the original node 604 are captured and copied to the same relative addresses within GPU memory 632, ensuring fidelity of all device pointers in the host address space. This eliminates the need to track and patch such pointers.

A similar issue arises in the case of handles returned by the various GPU calls. For example, a StreamCreate returns an opaque handle that will be stored in the host state, and then used as a reference in subsequent kernel launch calls initiated by the host process. However, on restore, the device may return a different handle for the same stream during replay. To preserve fidelity of these handles across checkpoint-resume, these handles are virtualized. The proxy node 606 that intercepts these calls does not return the actual handle returned by the device, but instead returns a virtual handle, and remembers this mapping as part of the CPU state. Any API that has any argument of allow-listed handle type first undergoes a translation of that argument before being passed to the proxy server. Proxy handles start from 0x00a0b0c0 onwards in increments of 1. There is no need to distinguish between handles and virtual handles. The only requirement is that live virtual handles are never reused across checkpoint/resumes. During restore/replay, it just updates this mapping table with the new physical handle but maps it to the same virtual handle. Because the rest of the host process only stores and operates on virtual handles, it continues to be consistent after a resume.

Stateful API calls create handles to contexts, streams, events, basic linear algebra subprograms (BLAS), DNN, libraries of multi-GPU collective communication primitives, or set associations between handles or change configuration. Stateful API calls are captured in a log 640 and stored as the GPU memory 632, and replayed upon restore in the same chronological order. This log may get longer with each learning iteration. But much of the log may be compressed in one of the following ways. First, if configuration of handle is changed or a new association is made between handles, idempotent changes are detected but not recorded for replay. Also, depending on the type of the change, only the most recent call is replayed even if it is not idempotent. Since each GPU proxy client 633 uses a single device and single stream, the latter compression is done without worrying about contents of the replay list in between two calls of same type.

Also, if a handle that was created earlier is destroyed (e.g., a multi-GPU communication primitive handle), some examples delete all the creation, change configuration, and set association calls in the log 640 linked to that particular handle. To achieve this, every time something is recorded in the replay log, a "garbage collection key" (gc_key) is associated with it. When a new item is getting recorded with the same gc_key or a handle linked with a gc_key is destroyed, the replay log is compressed and kept short.

With these, the replay list comes down to 5 to 100 calls depending on the model and can be executed in under a couple of seconds. In some implementations and examples, that does not depend on the duration of the execution of the model but only on the time within the iteration at which the checkpoint is performed. Doing the checkpoint close to or at the iteration boundary results in the least replay log 640—doing at an epoch boundary makes the log even smaller. The log is a list of live handles and their configuration that are still in use, and hence needs to be replayed, in some examples.

The checkpoint service 600 handles both multi-GPU and multi-node DLT jobs 602. In some examples, the distributed DLT job 602 is running in multi-process mode (e.g., one process per GPU). Each process works its own proxy and is started with the right environment variables to indicate to the proxy which GPU to use. Each process is checkpointed in the distributed DLT jobs 602 separately (as each would have its own data loader and rank state, etc.).

The checkpointing framework also coordinates across processes to checkpoint at the same point in the workflow and not start any new AllReduce. For example, if some processes had started an AllReduce and some other processes decide to checkpoint before doing that AllReduce, then this results in a deadlock. Implementations and examples ensure that no AllReduce or collective operations are in flight in any of the processes when the checkpointing happens. In addition, after the restore, the tasks may be mapped to a different set of network endpoints, which means the communication endpoints (e.g., the ProcessGroup notion that Pytorch maintains) are re-initialized to point to the new addresses. Today, the setup of endpoints is done by the user script at the start of the job; whereas, with current checkpointing, this must be re-done after every restore.

Users also do not have to do anything special to preempt or migrate a job. This is done by intercepting, at a low enough level, and checkpointing the process state of a DLT job 602 in a way that the user program is not aware what is happening. Again, it is transparent to the above software layers, both user code as well as framework libraries (e.g., PyTorch or TensorFlow).

In some implementations and examples, checkpointing involves deleting the process group created by the user script and passed to the DistributedataParallel class, as well as a few other DistributedDataParallel data-structures (e.g., Pytorch reducer) built over the process group. Restore involves just reinitializing the process group and the dependent DistributedDataParallel data-structures. The single-GPU checkpoint/restore mechanisms are invoked via the proxy process 620.

In some implementations and examples, a user has the option to bring their own container with specific libraries, etc. At a platform level, only the cmdline/env of such DLT job 602 is augmented to perform LD_PRELOAD with a version of the proxy libraries that spawn a proxy process at the first GPU call. A proxy library keeps polling a local file to know whether it needs to initiate checkpointing.

In addition to the on-demand checkpointing, the proxy library also performs continuous checkpointing periodically (at a tunable frequency—e.g., once every 15 mins). This handles unplanned outages or job failures. The frequency is fixed to amortize the checkpointing overhead across a long execution time. Thus, for a planned outage or a scheduler-driven preemption, the DLT job 602 resumes at the very next iteration (e.g., no lost work), but for unplanned failures, the DLT job 602 may lose some amount of processing (e.g., 15 minutes).

In a continuous checkpointing mode, the checkpoint service 600 checkpoints the file system state, as the job would continue running after the checkpoint, and append to output files/logs. Thus, if the DLT job 602 is resumed later from a previous snapshot, the file system state would be inconsistent with the state of the job (e.g., the user may see duplicate log messages for the same step counter). To handle this, whenever a continuous checkpoint is created, the delta of changes made to the file system since the previous checkpoint is also copied over, by using rsync.

A client agent is a separate process that runs in the same container as the user's DLT job, and thus has access to the same file system namespace. This client agent is part of the base container image that users derive from, and thus has access to the local file system, in some examples. The client agent exposes the following example remore procedure call (RPC) interfaces:

InitiateCheckpoint(jobID), returns status "SUCCESS" or "error_code;
    IsCheckpointDone(jobID) (async) or WaitForCheckpoint (jobID) (blocking), returns "true" or "false"; and
    RestoreJob(checkpoint_location, checkpoint_time [default is latest checkpoint]).

On receiving InitiateCheckpoint( ), a client agent writes a file in the local file system indicating that a checkpoint request has been received. The proxy process 620 that runs as part of the DLT job 602 looks for this file to trigger checkpointing at the earliest "safe" opportunity. Once the proxy process 620 is "ready" to checkpoint (both in terms of correctness e.g., done with pending AllReduce, and performance, e.g., close to the low-memory point), it writes back to the file indicating that it is ready to be checkpointed, and stops (or kills) the proxy process 620. The client agent then performs a checkpoint of the user's process, which dumps the address space checkpoint into a local file. This local file is compressed and shipped to a remote store.

In some implementations and examples, the storage location to write the checkpoint is specified in the cmdline of the client agent. By default, the checkpoint location is a directory in the output directory of the job—for example, output_dir/<job_id>/<rank>/checkpoints/, which means the client agent is supplied credentials to write to the same directory, such as the blob store credentials. In some implementations and examples, the schedulers require all DLT jobs 602 write output to a particular store, and then have users enter credentials to that particular store, which it can use to bring up the client agent. To handle failures or incomplete checkpoints, a DONE file is written in the same directory after the rest of the checkpoint data is successfully written, in some examples.

In some implementations and examples, the client agent is also responsible for starting up the job in the new machine from a previous consistent checkpoint. The Restore API specifies the checkpoint directory, along with a rough timestamp (e.g., −1 means the latest). The semantics of the timestamp is advisory, in that the restore is done on a checkpoint that is (a) consistent/complete, and (b) the closest before the specified timestamp. The reason this is advisory is that the latest checkpoint may be corrupt or inconsistent. This is especially true in a distributed job, where each task writes its own checkpoint independently. It is possible some of the tasks succeed in writing the latest checkpoint while other tasks fail, in which case the previous checkpoint is what should be restored (as all tasks are guaranteed to have written the previous checkpoint). Because all tasks of a distributed job write to the same job ID, the client agent for each task looks at all the checkpoint directories of itself and that of all other tasks, and independently arrives at the same conclusion, which the checkpoint service 600 restores from.

The external service that consumes the API may be one of the schedulers, or some other service that notifies preemption signals for VMs, etc. One example performance expectation is that within a time buffer (e.g., 15 seconds) of InitiateCheckpoint, a checkpoint is written, or a failure is returned on which the job can be killed (to be restored from an older checkpoint). The reason for the time buffer is to allow the checkpointing to be done at a "safe" time and at a time that is aligned to a mini-batch boundary so that the checkpoint size is low. As most DLT jobs 602 have mini-batch times of under a second and certainly under 5 seconds, a 15-second time buffer is sufficient to ensure technical efficiency. However, in pathological cases where the job takes longer for a mini-batch, the proxy may take a forcible checkpoint after 10 seconds (without waiting for the low-memory threshold).

Unlike traditional programs, DLT jobs 602 frequently use GPUs, and GPU states are not easy to migrate. There are different libraries for checkpointing programs running in CPUs. Aspects of the disclosure are operable with any functionality that enables checkpointing of an entire CPU address space. These checkpointing libraries have the ability to checkpoint a process, move it to a new machine, and start it. But these checkpointing libraries do not work for GPUs, because they have a lot of proprietary states that are embedded in the GPU that are not understood by the checkpointing. Because GPU drivers are proprietary and impossible for checkpointing libraries to handle arises from several factors.

The disclosed examples checkpoint the client process and restructure it in such a way so that the server process is stateless. Then, the server process may be stopped, in which case the job is migrated to another server node. When the server process is brought up at the other server node, the server process can be recreated. To bring the server process up to speed, some implementations and examples log calls to the GPU to recreate the same state of the GPU at the new server node. Also, before the initial server is disabled, some examples capture the memory of the initial server so that the same memory may be recreated at the new server node. For example, the server may be copied to disc, and then the same pointers may be allocated to the new server. The disclosed examples therefore allow useful state to be copied from the client, the GPU state to be copied from the server, and then only the useful client state is checkpointed, and the server process is recreated. The sequence may then continue at the new server node.

An example implementation is next described. However, those skilled in the art will note that this can be implemented in any cluster, with any container technology (not just Kubernetes). Also, aspects of the disclosure are operable with any scheduler (not just the one described below). Some examples use Kubernetes as a cluster manager with a custom scheduler that allocates jobs to nodes. In this example, jobs are submitted as Docker containers. An example scheduler was implemented in Scala code, using the Akka Actors library for concurrency and remote procedure call library (RPC or gRPC) for performing remote procedure calls.

In some examples, there are four main modules: manager, scheduler, executor, and client. Manager exposes a REST API and a gRPC endpoint for the clients to connect to the scheduler. Scheduler makes decisions like placement, migration, ticket allocation, management of bonus tokens, trading, etc. In some examples, there is a global executor for performing gang scheduling of multi-server jobs and a local executor for each server in the cluster and together they are responsible for running the jobs on servers in proportion to the tickets allocated by the scheduler. The client, which runs inside the container alongside the job, also exposes a gRPC endpoint and is responsible for receiving commands from the executor to perform operations like suspend/resume, checkpoint/migrate, report job metadata, and report the status of the running jobs.

A mechanism utilized by disclosed examples is the ability to migrate jobs between nodes. In order to migrate jobs, DLT jobs are checkpointed on-demand and then resumed on a different node. Some DLT jobs are written with checkpoint capability so and resumed from a previous checkpoint if it exists. Typically, DLT jobs that use a checkpoint only checkpoint every epoch. An epoch can last several hours or more. While such checkpoints are useful to guard against occasional server failures, examples require much more fine-grained checkpointing for fairness and efficiency and to avoid losing precious compute time. Thus, an automatic, on-demand checkpoint mechanism is implemented.

To support job migration, PyTorch and TensorFlow frameworks were modified. Although generic process migration tools exist, they cannot handle processes with GPU state. In some implementations, a proxy process is forked with the main process. Some or all GPU calls made by the process are intercepted and directed to the proxy process. This way the address space of the main process remains CPU only and can be easily checkpointed. The example proxy process is responsible for: 1) translating all GPU handles such as stream, context, etc.; 2) keeping a log of all state changing GPU calls, so that they can be replayed upon a restore; and 3) memory management of GPU memory. The memory manager maps the virtual address space to the physical GPU address space in a consistent manner across migration, so that pointers to GPU memory remain completely transparent for the parent process. Upon checkpoint, the proxy's memory manager copies the GPU state to the CPU memory of the parent process and dies. The parent process can then be migrated. Upon restore the proxy process replays the log of state changing GPU calls and copies the GPU memory back. All communication between proxy and the parent process is handled via shared memory with negligible overhead. The proxy implementation remains unchanged between PyTorch and TensorFlow and requires only minimal modifications to the actual frameworks.

Example overhead for suspend-resume is similar as well, e.g., about 100-250 ms depending on the size of the model. However, some examples optimize the migration performance overhead by implementing a three-phase context switch called the suspend-preload-resume. When the framework is notified to suspend, it completes it within about 100 ms by copying the minimal data in the GPU (proxy process) at the end of a mini-batch of training to the CPU memory (parent process), thus, allowing the scheduler to run another job on the GPU. If the job is to be migrated across servers, then the scheduler performs a checkpoint on the job container and restores it on the target server. The framework then waits for a preload notification. When it receives the preload, it sets up the state on the new GPU(s) by replaying the log of all stateful operations but does not resume. Thus, preload hides the 5s latency for initialization of the GPU context. Finally, when the framework is notified to resume, it copies the data back to GPU memory, which (in some examples) takes about 100 ms, and quickly resumes the GPU computation. Thus, migration mostly occurs in the background while other jobs utilize the GPU.

The state tracked inside the GPU is done through closesource proprietary software inside the GPU and the CPU. For example, a user may have a PyTorch program that runs partly on a CPU and that ships computations to the GPU— e.g., the more expensive parts of the job are often run on the GPU. The state of the DL job spans across both the CPUs and in the GPUs, because some computations are done on the CPUs while others are done on the GPUs. Checkpointing libraries do not know what to do with tracking the states in the GPUs, which really pollutes the address space in the CPU. To solve this technical problem, examples keep the host address space of the CPU clean by implementing a split-process architecture through which the DLT job runs. When the GPU is called, the GPU call is not executed in that address space. Instead, the GPU call is executed in a separate process (aka proxy process) that interacts with the GPU. This ensures that only the address space of the proxy process gets polluted while the host process stays pristine.

The disclosed implementations and examples provides a highly scalable AI infrastructure. The service is designed to scale across hundreds of datacenters and tens of thousands of accelerators with training models of trillions of parameters. The service may be configured to cross-geographical boundaries as well. The architecture is also capable of treating training jobs and inferencing services as equal when they originate from data centers as well as on premises sources.

While the aspects of the disclosure have been described in terms of various examples with their associated operations, a person skilled in the art would appreciate that a combination of operations from any number of different examples is also within scope of the aspects of the disclosure.

While the examples provided involve implementations using GPUs, it will be appreciated that FPGAs, ASICs, or other specialized hardware may be used similarly to carry out the functionality described herein.

Figure 7:
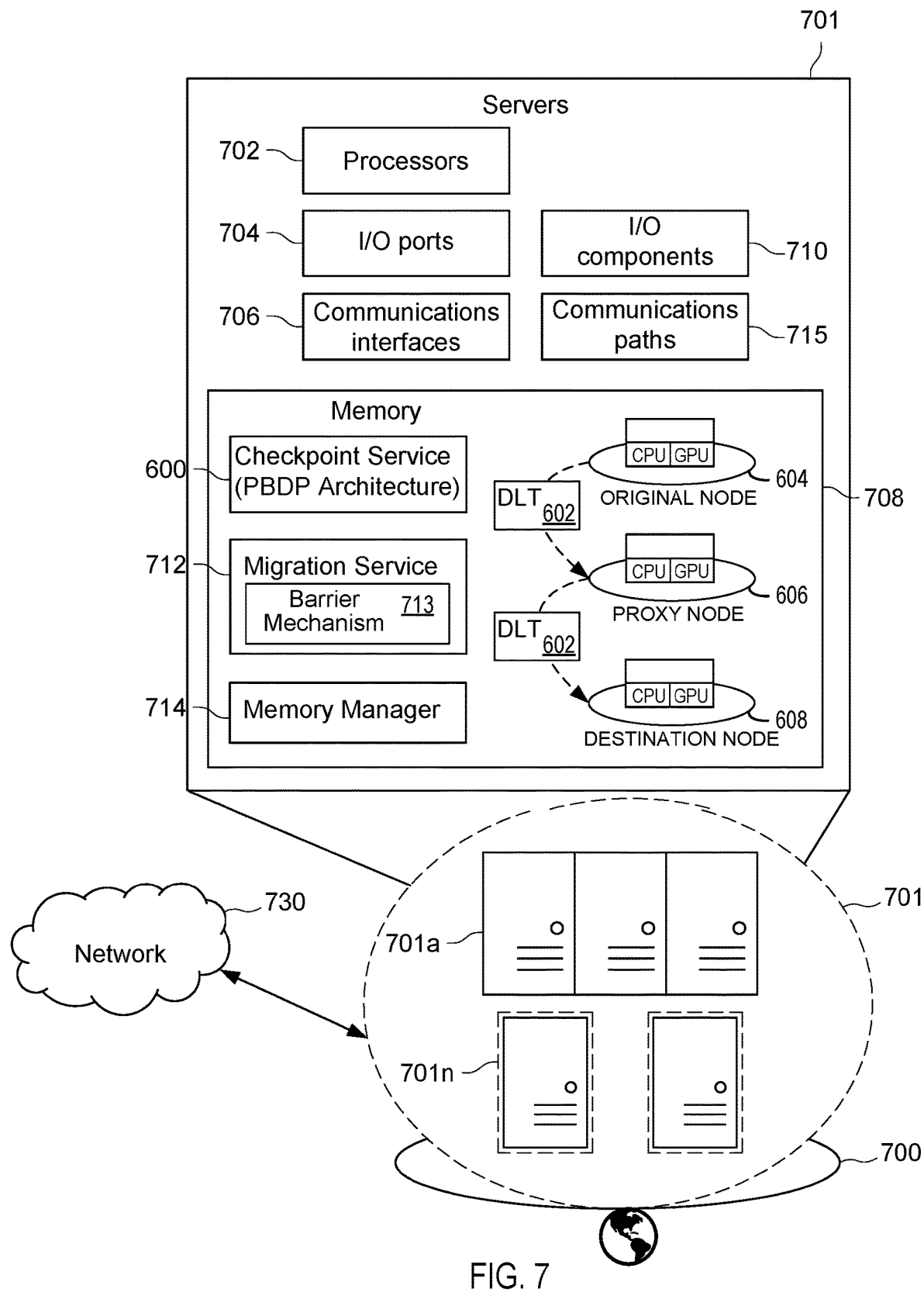
FIG. 7 illustrates a block diagram of a planet-scale AI infrastructure network environment implementing a migration service for moving DLT jobs from an original node to a destination node.

FIG. 7 illustrates a block diagram of a planet-scale AI infrastructure network environment (network environment 700) implementing for migrating DLT jobs 602 from the original node 604 to the destination node 608, according to an embodiment. Numerous computing devices communicate with the cloud environment 700 over a network 730. Cloud environment 700 represents a cloud infrastructure made up of numerous computer servers 701, which may be any type of server or remote computing device, either as a dedicated, relational, virtual, private, public, hybrid, or other cloud-based resource. As depicted, servers 701 include a mixture of physical servers 701a and virtual servers 701n, the latter of which are set up as VMs running inside of cloud environment 700. For the sake of clarity, these physical servers 701a and virtual servers 701n are collectively discussed as "servers 701," unless otherwise indicated. In some implementations and examples, the cloud environment 700 is operated as a large-scale (e.g., planetary) cloud environment (e.g., COSMOS developed by the MICROSOFT CORPORATION®), handling large amounts of data, such as an exabyte or more. Such implementations and examples may operate the various servers 701 partially or wholly across the globe.

Servers 701 include or have access to one or more processors 702, I/O ports 704, communications interfaces 706, computer-storage memory 708, I/O components 710, and communications paths 715.

Memory 708 represents a quantity of computer-storage memory and memory devices that store executable instructions and data for automatically tuning operational parameters of the cloud environment 700. Memory 708 stores executable instructions for the previously discussed checkpoint service 600 used to checkpoint DLT jobs 602 before migration from the original node 604 to the destination node 608 through the proxy node 606, discussed above and shown in FIG. 6. Additionally, the memory 708 stores instructions for a migration service 712 that effectively moves the DLT job 602 from the original node 604 to the destination node 608 using the disclosed techniques referenced herein. Further still, memory 708 stores executable instructions for a memory manager 714 that handles allocation of the DLT jobs 602 to different memory locations throughout the network environment 700. The checkpoint service 600, the migration service 712, and the memory manager 714 may be implemented in software, firmware, hardware, or a combination thereof in various implementations and examples.

To support job migration, PyTorch and TensorFlow frameworks are slightly modified by the migration service 712, in some examples. In other examples, other frameworks are used. Some implementations may handle unmodified user code, requiring somewhat minor changes to both the frameworks. Although generic process migration tools exist, they cannot handle processes with GPU state. In some implementations, the proxy process 620 within the checkpoint service 600 is forked with a main process. Some or all GPU calls made by the process are intercepted and directed to the proxy process 620. This way, the address space of the main process remains CPU only and can be easily checkpointed. The proxy process 620 is responsible for: 1) translating all GPU handles such as stream, context, etc.; 2) keeping a log of all state changing GPU calls, so that they can be replayed upon a restore; and 3) memory management of GPU memory. The memory manager 714 maps the virtual address space to the physical GPU address space in a consistent manner across migration, so that pointers to GPU memory remain completely transparent for the parent process. Upon checkpoint, the proxy's memory manager copies the GPU state to the parent process' CPU memory and dies. The parent process can then be migrated. Upon restore, the proxy process 620 replays the log of state changing GPU calls and copies the GPU memory back. All communication between proxy and the parent process is handled via shared memory with negligible overhead, in some examples. The proxy implementation remains unchanged between PyTorch and TensorFlow and requires only minimal modifications to the actual frameworks.

Cloud resource overhead (e.g., CPU, GPU, memory, VM, etc.) for suspension-and-resumption (suspend-resume) is similar as well, e.g., about 100-250 milliseconds (ms) depending on the size of the model. In some implementations, the migration service 712 optimizes migration overhead by implementing a three-phase context switch called the suspend-preload-resume. In some examples, when the migration service 712 is notified to suspend, the migration service 712 completes suspension within about 100 ms by copying the GPU memory 632 (using the proxy process 620) at the end of a mini-batch of training to the CPU memory 629 of the parent process. This allows the scheduler (global or regional) to run another DLT job 602 on the GPU 611 of the original node 604.

Some examples perform check pointing across numerous GPUs. For example, there may be a DLT job 602 running on 100$s$ of GPUs. Collaboratively, because these 100s of GPUs are working together, a consistent checkpoint must be taken. To do so, examples apply or use a "distributive barrier" across the multiple different GPUs, discussed in more detail below.

To implement the multi-barrier examples, the barrier mechanism 713 performs the following functions. A "meta AllReduce" is performed before an actual AllReduce is performed. In some instances, additional interceptors are coded into the GPUs communications library, or other similar, calls. A meta AllReduce is performed asynchronously in the background to ensure latency issues are not created. When any of the disclosed schedulers decide to migrate a DLT job 602, such migration is done on-demand. When an AllReduce is performed, a sum is computed across all of the workers. The disclosed examples use a similar sum to quickly figure how many AllReduces the workers have issued. A maximum AllReduce count is computed, giving a barrier point for when to stop all of the workers to effectuate migration.

In some examples, barriers are implemented through a multi-GPU communication API interception in the following manner. APIs are intercepted, similar to interception of other libraries and proxy calls. Statefuls APIs (e.g., CommInitRank) may be replayed on restore. Comm_t returned by the above operations is virtualized and transparently recreated with a new unique identifier (UniqueId) upon restore. UniqueId contains a socketaddr of a main process of the barrier mechanism 713.

The main process creates the UniqueId before performing the CommInitRank. Other workers get the above UniqueId from the main process out of band before they can also do a CommInitRank. In one flow, this sharing is the responsibility of Pytorch/horovod/tf, using pytorch FileStore/TCP-Store etc. And there is no use of this out-of-band (OOB) channel after the initial exchange of the UniqueId, in some examples. Otherwise, in restore flow, this may be handled by AISC in APACHE®-branded frameworks. Collective APIs (e.g., AllReduce) may also be intercepted.

In some implementations and examples, the protocol for OOB channels is implemented in the following manner. A main process receives a checkpoint signal and coordinates the previously discussed checkpointing amongst computing devices of the original node 604. Processes use a coordinator thread to implement synchronization protocol via an OOB channel, and each process tracks the following mutex protected variables: current_collective_count, maybe_stall, max_collective_count, and the like. Proxied collective calls in the main thread proceed if either: maybe_stall is false, or current_collective_count is less than max_collective_count. Intercepted implementations block if there is no green signal from the distributed worker coordination thread, else the calls are proxied.

In operation, the main process waits for the checkpoint signal, waits until a memory point declines or is at a low memory point, and then broadcasts a stall signal to computing devices (workers) of the original node 604. The workers at the original node 604 then set a value "maybe_stall" equal to true and respond with their current collective counts (current_collective_count) back to the main process. In turn, the main process captures a maximum of all the current_collective_count values and broadcasts this maximum current collective count to all of the workers of the original node 604. The workers set their respective current collective counts to maximum current collective count of the broadcast, wait until their respective current collective count exceeds the maximum current collective count, and then perform a checkpoint. After the checkpoint, the workers restore by setting maybe_stall to false.

Along these lines, an example main process operates in the following manner:

```
AllReduce( ) {
    while(true) {
        MutexLock 1(mutex);
        if (maybe_stall &&
            current_collective_count > max_collective_count ) {
            sleep(some_time);
        } else {
            ++current_collective_count;
            break;
        }
    }
}
```

Additionally or alternatively, some implementations and examples use multi-GPU communication primitives as the only cross worker communication, without an OOB channel. These implementations and examples similarly intercept stateful and collective APIs. The main process waits for a checkpoint request. With every AllReduce, the workers also enqueue an asynchronous (async) meta AllReduce on an exclusive stream to compute the following: sum(needs_barrier) and sum(acked_barrier). A parameter "needs_barrier" includes a rank of 0 and sets it to 1 when checkpointed is initiated. Other workers also set similar ranks to 0.

Additionally, preparation is made for checkpointing. Anytime a worker detects sum(needs_barrier) equals 1, the worker performs AllReduces synchronously and sets acked_barrier to 1. Moreover, the first meta AllReduce in in above operations result in sum(acked_barrier) being set to "world_size," for the planet-scale cloud environment.

Additionally or alternatively, a heartbeat meta AllReduce may be implemented in the following manner. The main process waits for a checkpoint request. Each rank is assigned a meta AllReduce budget in the following manner: (1) the budget is set to 1 at the start, (2) the budget is incremented by 1 after each data AllReduce calls, and (3) the budget is incremented again by 1 when all ranks time out. Each rank (with its budget) issues a meta AllReduce if either a timeout occurs (e.g., timer T lapses since last collective operation, which may be issued synchronously) or data AllReduce is issued before the timeout, which may be issued asynchronously. In some implementations and examples, the meta AllReduce computes sums for the following: (1) needs_barrier: rank 0 sets it to 1 if it wants to checkpoint, else 0; (2) issued_on_timeout: set to 1 if issued due to timeout, else 0.

If sum(issued_on_timeout) is set to world_size, all ranks are timed out, meta AllReduces for all were synchronous, and all ranks are in lockstep. Also, all ranks decide to issue one more meta AllReducebefore next dataAllReduce, e.g., each rank increases its meta AllReduce budget by 1. This may be repeated sum(issued_on_timeout)<world_size. Using these operations, a heartbeat is provided with a global order.

Every AllReduce call from a user script is put in a queue, to be scheduled by a background thread later. The background thread runs synchronous meta AllReduces frequently to come to a consensus on which AllReduces to do next. All workers have their own current_allreduce_count—the number of AllReduce calls made by user script (but not necessarily scheduled).

More specifically, in some implementations and examples, each synchronous meta AllReduce computes max (needs_checkpoint) and max(current_allreduce_count). If max(needs_checkpoint) equals 0: the background thread schedules queued allreduces till current_allreduce_count reaches max(current_allreduce_count), then does synchronous meta AllReduce again (delay by a time such as 5 ms to avoid spinning and allow queue growth). If max(needs_checkpoint) equals 1, the barrier is already reached, and checkpointing may be performed immediately.

To handle GPU calls on streams, some implementations and examples mark the streams associated with queued AllReduce calls as tainted until the AllReduce is actually scheduled by the background thread. All calls involving tainted streams (synchronize, event*, allreduce, etc.) wait for the background thread to un-taint their stream before that call can be sent to the GPU of the proxy node 606.

In some implementations and examples, the background thread is operated asynchronously. All incoming collectives are queued up. A background thread is set to be in charge of metadata consensus and issuing the queued collectives to the multi-GPU communication primitives. A communication channel can be either an existing transport or an OOB transport like TCP, FileStore, RedisStore, or the like. To work with one of queue or OOB or store, at each tick, a synchronous blocking of the metadata send+recv is performed to discover two things across workers: lsni=num_allreduces_sent_so_far plus max(allreduce_queue_size_across_workers), and needs_checkpoint. If needs_checkpoint is false, it is safe to send upto lsni allreduces, after which short sleep is performed to allow queue growth, and then another blocking synchronous metadata send+recv is performed. Also, metadata send+recv may be made asynchronous.

Additionally or alternatively, all incoming collectives may be queued up. The background thread is made in charge of worker consensus and sending the queued collectives to the multi-GPU communication primitives. Communication channels used include either: (1) existing transports, or (2) OOB transports. In some implementations and examples, this is performed in the following manner:

```
global_N0 = 0
NumUnilateral(int N) is a func that
    Returns some number <= N
    Return value > 0 if N > 0
needs_barrier0 = false
wait_time = 10ms
```

Then, if needs_barrier is set to true, the barrier has successfully be acquired. If not, each worker does the following. The workers ensure the wait_time has lapseed since the last update to global_Ni. Set local_Ni to NumUnilateral (num_pending_collectives_in_queue). Asynchronous metadata send+recv is checked whether it agrees on needs_barrieri+1=needs_barrieri+1 from rank 0, and global_Ni+1=max_over_all_workers(local_Ni). If so, local_Ni collectives are unilateraly dispatched. Additionally, asynchronous metadata send+recv waited out to finish. If local_Ni<global_Ni+1, more collectives are sent until local_Ni equals global_Ni+1.

If the DLT job 602 is to be migrated across servers 701 (i.e., from original node 604 to destination node 608), the disclosed schedulers perform a checkpoint on the DLT job 602, using the checkpoint service 600, and the migration service 712 restores the DLT job 602 on the destination node 608. The migration service 712 may be configured to wait for a preload notification. When the migration service 712 receives the preload notification, the migration service 712 sets up the state on the new GPU(s) 618 of the destination node 608 by replaying the log of all stateful operations (e.g., from the GPU state 630 and/or the CPU state 627), but does not resume. Thus, preload hides a latency (e.g., 5 seconds) for initialization of the GPU context.

When the migration service 712 is notified to resume, the migration service 712 copies the data back to GPU memory of the GPU 618 on the destination node 608, which (in some examples) takes about 100 ms. The migration service 712 quickly resumes the GPU computation on the destination node 608. Thus, migration mostly occurs in the background while other DLT jobs 602 utilize the GPU.

The GPU state 630 is, in some implementations and examples, tracked inside the GPU 611 of the original node 604 through close-source proprietary software inside the GPU 611 and the CPU 610. For example, a user may have a PyTorch program that runs partly on a CPU and that sends computations to the GPU—e.g., the more expensive parts of the job are often run on the GPU. The state of the DLT job spans across both the CPUs and in the GPUs, because some computations are done on the CPUs while others are done on the GPUs. Checkpointing libraries do not know what to do with tracking the states in the GPUs, which really pollutes the address space in the CPU. To get around this, some of the examples described herein keep the host address space of CPU clean by implementing a split-process architecture through which the DLT job runs. When the GPU is called, the GPU call is not executed in that address space. Instead, the GPU call is executed in a separate process (aka a proxy process) that interacts with the GPU. This ensures that only the address space of the proxy process gets polluted while the host process stays pristine.

The disclosed implementations and examples provides a highly scalable AI infrastructure. The checkpoint service 600, migration service 712, and memory manager 714 are designed to scale across 100s of datacenters and tens of thousands of accelerators with training models of trillions of parameters. The service may be configured to cross-geographical boundaries as well. The architecture is also capable of treating training jobs and inferencing services as equal when they originate from data centers as well as on premises sources.

Other examples perform checkpointing across numerous GPUs. For example, there may be a DLT job 602 running on 100s of GPUs. Collaboratively, because these 100s of GPUs are working together, a consistent checkpoint must be taken. To do so, the checkpoint service 600 applies and uses a "distributive barrier" protocol across the multiple different GPUs 611 of the original nodes. In operation, each worker of the original node 604 runs a mini-batch, and then at the end of all the mini-batches, the workers all exchange the results. At the end of the mini-batches, each worker determines a gradient then performs one or more AllReduces. For some GPUs 611, the AllReduce library is part of a library providing inter-GPU communication primitives. Some examples interpose on the AllReduce happens, effectively piggybacking a new protocol on top of the regular AllReduce that the user performs. Other examples introduce the new protocol on similar types of AllReduce calls.

Alternatively, the checkpoint service 600 may direct the migration service 712 to implement a multi-GPU barrier, via the barrier mechanism 713, through performing the meta AllReduce before an actual AllReduce is performed. This requires some additional interceptors to be coded that interact with communication library calls. The meta AllReduce is performed asynchronously in the background to ensure latency issues are not created. When the disclosed schedulers decide to migrate a job, such migration is done on-demand. When an AllReduce is performed, a sum is computed across all of the workers/GPUs 611. The disclosed examples use a similar sum to quickly figure how many AllReduces the workers have issued. A maximum AllReduce count is computed, giving a barrier point for when to stop all of the workers to effectuate migration.

Figure 8:
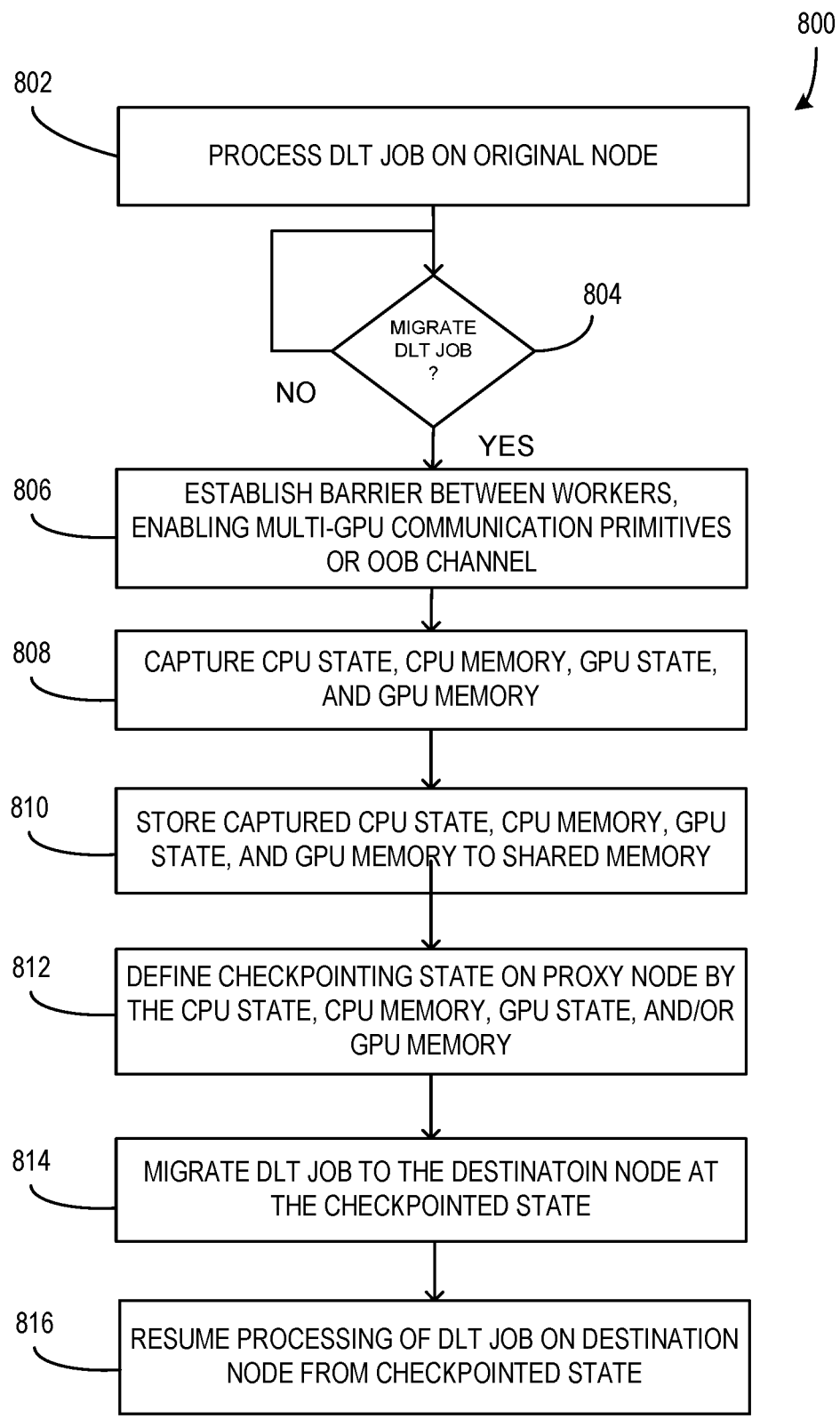
FIG. 8 illustrates a flow chart diagram depicting an operation flow for checkpointing of a DLT job, at an original node in a cloud computing environment and resuming the DLT job from the checkpointed state on a different destination node.

FIG. 8 illustrates a flow chart diagram depicting an operation flow 800 for checkpointing of a DLT job, at one (original) node in a cloud computing environment and resuming the DLT job from the checkpointed state on a different (destination) node. Operational flow 800 involves a DLT job being processed on the original node, as shown at 802. This happens until either the DLT job is finished processing or until either the global scheduler, regional scheduler, or coordinator service schedules to have the DLT job migrated to the destination node, as shown at 804. If so, a barrier may be established between workers of the original node, enabling communication through multi-GPU communication primitives (along a background thread) or through an OOB channel, as shown at 806.

The GPU state, GPU memory, CPU state, and CPU memory, or a combination thereof, are captured, as shown at 808, and moved the previously discussed shared memory, which is shared between the original node and a proxy node, as shown at 810. A checkpointing state is defined on the proxy node by the GPU state and CPU state, or by any combination of the CPU state, CPU memory, GPU state, and GPU memory, as shown at 812. The DLT job is migrated to the destination node at the checkpointed state, as shown at 814. And processing of the DLT job is resumed on the destination node from the checkpointed state, as shown at 816.

Figure 9:
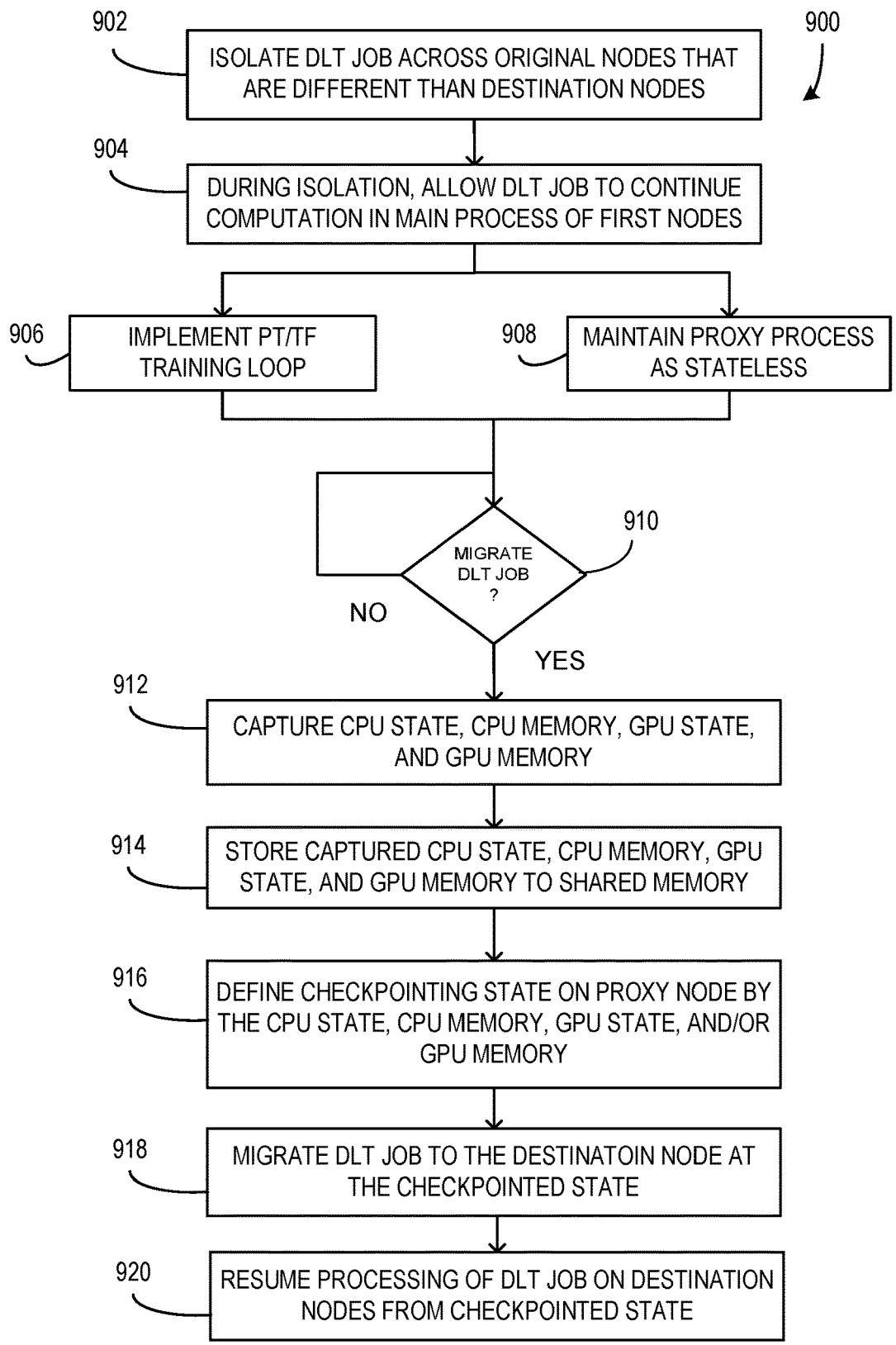
FIG. 9 illustrates a flow chart diagram depicting an operation flow for checkpointing of a DLT job across a plurality of first nodes in a cloud computing environment and resuming the DLT job from a checkpointed state across a plurality of second nodes that are different than the first nodes.

FIG. 9 illustrates a flow chart diagram depicting an operation flow 900 for checkpointing of a DLT job across a plurality of first nodes in a cloud computing environment and resuming the DLT job from a checkpointed state across a plurality of second nodes that are different than the first nodes. Operational flow 900 involves isolating GPU-related activity of the DLT job across a first group of original nodes that are different than the destination nodes, as shown at 902. This isolation may be done using the proxy process discussed above. During the isolation, the DLT job is allowed to continue computations in one or more main processes of the first nodes, as shown at 904. In some implementations and examples, the computation includes Python code with a PT/TF training loop being implemented, as shown at 906, and the proxy process used to isolate the DLT job is maintained in a stateless state across a plurality of checkpoints until migration occurs, as shown at 908. These two are implemented and maintained until the DLT job finishes processing or is scheduled to be migrated, the latter being shown at 910.

When migration is scheduled by the global scheduler, regional scheduler, the DLT job is migrated to the destination nodes, the GPU state, GPU memory, CPU state, and CPU memory, or a combination thereof, are captured, as shown at 912, and moved the previously discussed shared memory, which is shared between the original node and a proxy node, as shown at 914 A checkpointing state may then be defined on the proxy node by the GPU state and CPU state, or by any combination of the CPU state, CPU memory, GPU state, and GPU memory, as shown at 916. The DLT job may then be migrated to the destination nodes at the checkpointed state, as shown at 918. And processing of the DLT job may be resumed on the destinations node from the checkpointed state, as shown at 920.

Example Operating Environment

Figure 10:
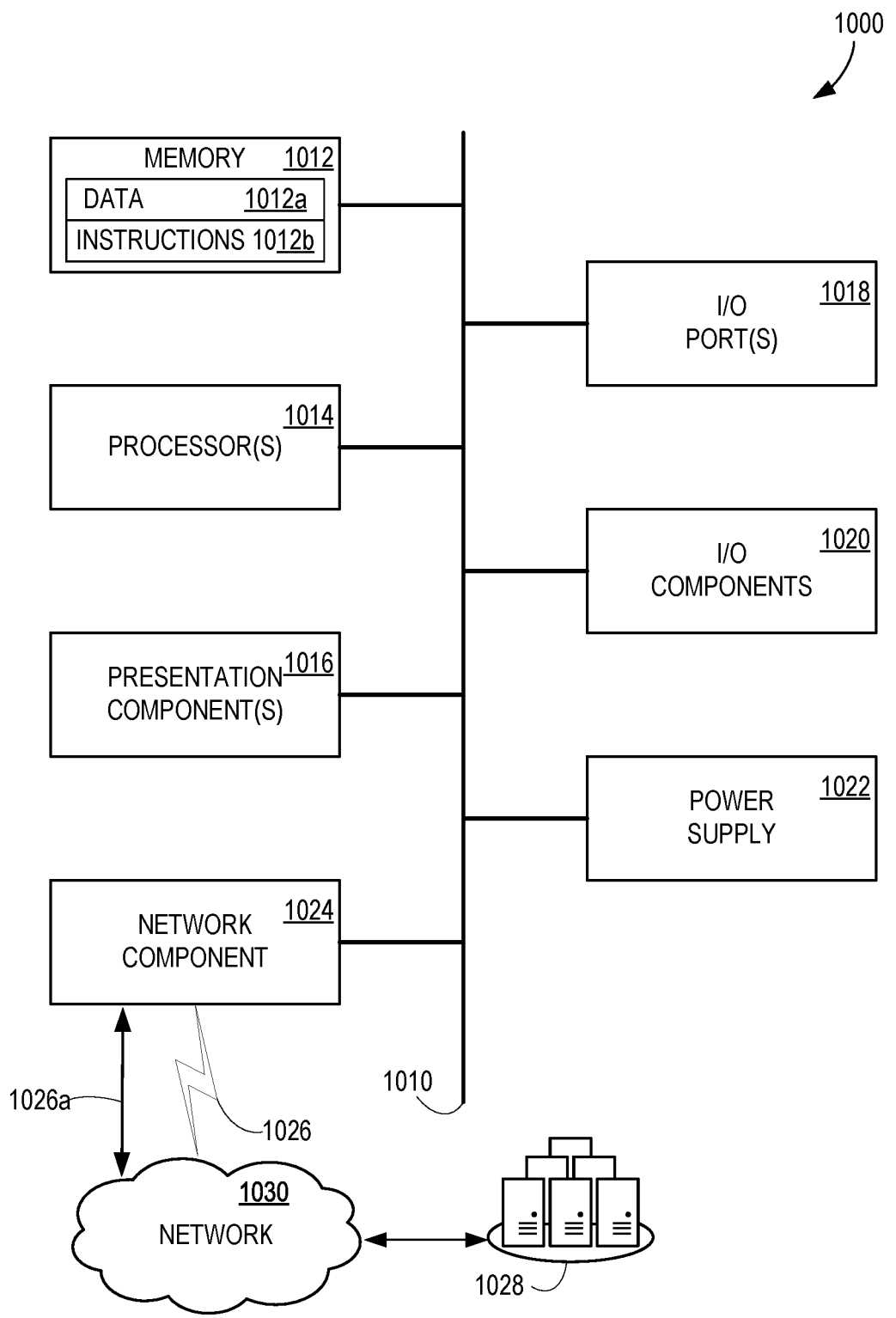
FIG. 10 illustrates an example computing device.

FIG. 10 is a block diagram of an example computing device 1000 for implementing aspects disclosed herein, and is designated generally as computing device 1000. Computing device 1000 is but one example of a suitable computing environment and is not intended to suggest any limitation as to the scope of use or functionality of the examples disclosed herein. Neither should computing device 1000 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1000 includes a bus 1010 that directly or indirectly couples the following devices: computer-storage memory 1012, one or more processors 1014, one or more presentation components 1016, input/output (I/O) ports 1018, I/O components 1020, a power supply 1022, and a network component 1024. While computing device 1000 is depicted as a seemingly single device, multiple computing devices 1000 may work together and share the depicted device resources. For example, memory 1012 is distributed across multiple devices, and processor(s) 1014 is housed with different devices.

Bus 1010 represents what may be one or more busses (such as an address bus, data bus, or a combination thereof). Although the various blocks of FIG. 10 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 10 and the references herein to a "computing device." Memory 1012 may take the form of the computer-storage media references below and operatively provide storage of computer-readable instructions, data structures, program modules and other data for the computing device 1000. In some examples, memory 1012 stores one or more of an operating system, a universal application platform, or other program modules and program data. Memory 1012 is thus able to store and access data 1012*a* and instructions 1012*b* that are executable by processor 1014 and configured to carry out the various operations disclosed herein.

In some examples, memory 1012 includes computer-storage media in the form of volatile and/or nonvolatile memory, removable or non-removable memory, data disks in virtual environments, or a combination thereof. Memory 1012 may include any quantity of memory associated with or accessible by the computing device 1000. Memory 1012 may be internal to the computing device 1000 (as shown in FIG. 10), external to the computing device 1000 (not shown), or both (not shown). Examples of memory 1012 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 1000. Additionally, or alternatively, the memory 1012 may be distributed across multiple computing devices 1000, for example, in a virtualized environment in which instruction processing is carried out on multiple devices 1000. For the purposes of this disclosure, "computer storage media," "computer-storage memory," "memory," and "memory devices" are synonymous terms for the computer-storage memory 1012, and none of these terms include carrier waves or propagating signaling.

Processor(s) 1014 may include any quantity of processing units that read data from various entities, such as memory 1012 or I/O components 1020. Specifically, processor(s) 1014 are programmed to execute computer-executable instructions for implementing aspects of the disclosure. The instructions may be performed by the processor, by multiple processors within the computing device 1000, or by a processor external to the client computing device 1000. In some examples, the processor(s) 1014 are programmed to execute instructions such as those illustrated in the flow charts discussed below and depicted in the accompanying drawings. Moreover, in some examples, the processor(s) 1014 represent an implementation of analog techniques to perform the operations described herein. For example, the operations are performed by an analog client computing device 1000 and/or a digital client computing device 1000. Presentation component(s) 1016 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1000, across a wired connection, or in other ways. I/O ports 1018 allow computing device 1000 to be logically coupled to other devices including I/O components 1020, some of which may be built in. Example I/O components 1020 include, for example but without limitation, a microphone, joystick, game pad, satellite dish, scanner, printer, wireless device, etc.

The computing device 1000 may operate in a networked environment via the network component 1024 using logical connections to one or more remote computers. In some examples, the network component 1024 includes a network interface card and/or computer-executable instructions (e.g., a driver) for operating the network interface card. Communication between the computing device 1000 and other devices may occur using any protocol or mechanism over any wired or wireless connection. In some examples, network component 1024 is operable to communicate data over public, private, or hybrid (public and private) using a transfer protocol, between devices wirelessly using short range communication technologies (e.g., near-field communication (NFC), BLUETOOTH branded communications, or the like), or a combination thereof. Network component 1024 communicates over wireless communication link 1026 and/or a wired communication link 1026*a* to a cloud resource 1028 across network 1030. Various different examples of communication links 1026 and 1026*a* include a wireless connection, a wired connection, and/or a dedicated link, and in some examples, at least a portion is routed through the internet.

Although described in connection with an example computing device 1000, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example method for providing checkpointing of a DLT job, at one node in a cloud computing environment and resuming the DLT job from a checkpointed state on a different node comprises: capturing a GPU state of a GPU executing on the DLT job, wherein the GPU state includes GPU data comprising model parameters and an optimizer state located in the GPU at the time of checkpointing; capturing a CPU state of a CPU executing on the DLT job; storing the CPU state and the GPU state in shared memory that is accessible by a proxy node, the checkpointed state being defined, at least partially, by the GPU state and the CPU state; migrating the DLT job to the different node at the checkpointed state using the GPU state and the CPU state; and initiating resumption of processing of the DLT job from the checkpointed state on different node.

An example method for providing checkpointing deep learning training (DLT) jobs across a plurality of first nodes in a cloud computing environment and resuming the DLT jobs from a checkpointed state across a plurality of second nodes that are different than the first nodes, comprises: receiving a checkpoint request; incident to said receipt of the checkpoint request, performing operations comprising: establishing a barrier between workers of the first nodes, and enabling the workers to communicate across the barrier using at least one multi-GPU communication primitive or an out-of-band (OOB) channel; for a subset or all of the DLT jobs, capturing graphics processing unit (GPU) states of GPUs executing the DLT jobs on the workers, wherein the GPU states include GPU data comprising model parameter and optimizer state; for the subset or all of the DLT jobs capturing central processing unit (CPU) states of CPUs executing the DLT jobs on the workers; and migrating the subset or all of the DLT jobs to the different node at checkpointed states using the GPU states and the CPU states.

An example method for providing checkpointing of a DLT job across a plurality of first nodes in a cloud computing environment and resuming the DLT job from a checkpointed state across a plurality of second nodes that are different than the first nodes comprises: isolating GPU-related activity of the DLT job across the first plurality of nodes in the cloud computing environment into a separate proxy process; and during said isolation, allowing the DLT job to continue computation in a main process, wherein said computation comprises Python code with a PT/TF training loop, and wherein the proxy process is stateless across a plurality of checkpoints.

An example system for operating a cloud computing environment that facilitates halting deep DLT jobs and resuming the DLT jobs from a checkpointed state in a different area of a cloud computing environment comprises: a first node in a plurality of first nodes providing processing resources for the DLT jobs; a second node in a plurality of second nodes providing secondary processing resources for the DLT jobs, wherein the DLT jobs are halted on the plurality of first nodes through: isolating GPU-related activity of the DLT job across the first plurality of nodes in the cloud computing environment into a separate proxy process, and during said isolation, allowing the DLT job to continue computation in a main process, wherein said computation comprises Python code with PT/TF training loop, and wherein the proxy process is stateless across a plurality of checkpoints; and wherein the DLT jobs are migrated to the plurality of second nodes using the proxy process and the main process.

Alternatively, or in addition to the other examples described herein, examples include any combination of the following:
- capturing a portion of GPU memory that is active during processing of the DLT job on the original node, the portion of the GPU memory containing the model parameters;
- resuming the DLT job on a second GPU and a second CPU that are different than the GPU and the CPU, respectively;
- saving a program state associated with the DLT job; and restoring the DLT job on another node through switching control flow to the program state;
- isolating GPU-related activities into a separate proxy process that has a different address space than the GPU; and computing the DLT job in a main process associated with the CPU, wherein the proxy process is stateless across checkpoints, isolating any temporary GPU-related mappings to the address space of the proxy process;
- wherein the main process address space remains without any GPU-related state;
- directing a proxy server to read the GPU function call parameters from shared memory and execute corresponding GPU function calls in an address space of the proxy process; and shipping back return values to a proxy client through shared memory;
- moving GPU-related activity of the DLT job into a separate address space using dynamic library interposition on GPU-related calls, wherein the GPU-related calls are intercepted in the main process by a client of a proxy process, which serializes and writes the GPU function call parameters into shared memory;
- wherein the barrier is established through, in part, performing a meta AllReduce operation for the workers before performing AllReduce operations individually on the workers;
- wherein the AllReduce operations comprise computing maximum and AllReduce count values across the workers;
- wherein the at least one multi-GPU communication primitive is set to operate in a background thread;
- wherein the barrier is established through, in part, performing a heartbeat meta AllReduce operation;
- wherein the DLT job is a PyTorch job;
- wherein the DLT job is a TensorFlow job;
- an address space of the proxy process is polluted with GPU-related mappings while the main process address space remains without any GPU-related states;
- wherein the main process address space is able to be checkpointed; and
- moving GPU-related activity of the DLT job into a separate address space using dynamic library interposition on GPU-related calls, wherein the GPU-related calls are intercepted in the main process by a client of a proxy process, which serializes and writes the GPU function call parameters into shared memory.

The embodiments illustrated and described herein as well as embodiments not specifically described herein but within the scope of aspects of the claims constitute an exemplary means for checkpointing and migrating a machine-learning job (or DLT job), by at least one processor of the cloud infrastructure platform, from one or more original nodes to one or more destination nodes, using one or more proxy nodes.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for providing checkpointing of a deep learning training (DLT) job, at one node in a cloud computing environment and resuming the DLT job from a checkpointed state on a different node, the method comprising:
    capturing a graphics processing unit (GPU) state of a GPU executing on the DLT job, wherein the GPU state includes GPU data comprising model parameters and an optimizer state located in the GPU at a time of checkpointing;
    capturing a central processing unit (CPU) state of a CPU executing on the DLT job;
    migrating the DLT job to the different node at the checkpointed state using the GPU state and the CPU state;
    initiating resumption of processing of the DLT job from the checkpointed state on the different node;
    isolating a GPU-related activity into a separate proxy process that has a different address space than the GPU; and
    computing the DLT job in a main process associated with the CPU,
    wherein the proxy process is stateless across checkpoints, isolating a temporary GPU-related mapping to the address space of the proxy process.

2. The method of claim 1, further comprising capturing a portion of GPU memory that is active during processing of the DLT job on the one node, the portion of the GPU memory containing the model parameters.

3. The method of claim 1, further comprising:
    resuming the DLT job on a second GPU and a second CPU that are different than the GPU and the CPU, respectively.

4. The method of claim 1, further comprising:
    saving a program state associated with the DLT job; and
    restoring the DLT job on another node through switching control flow to the program state.

5. The method of claim 1, further comprising establishing a barrier
    wherein a main process address space remains without any GPU-related state.

6. The method of claim 1, further comprising:
    directing a proxy server to read GPU function call parameters from shared memory and execute corresponding GPU function calls in an address space of the proxy process; and
    shipping back return values to a proxy client through shared memory.

7. The method of claim 1, wherein the isolating of the GPU-related activity comprises moving the GPU-related activity of the DLT job into the different address space using dynamic library interposition on GPU-related calls, wherein the GPU-related calls are intercepted in the main process by a client of a proxy process, which serializes and writes GPU function call parameters into shared memory.

8. The method of claim 1, wherein the DLT job is a PyTorch job.

9. The method of claim 1, wherein the DLT job is a TensorFlow job.

10. A method for providing checkpointing deep learning training (DLT) jobs across a plurality of first nodes in a cloud computing environment and resuming the DLT jobs from a checkpointed state across a plurality of second nodes that are different than the first nodes, the method comprising:
    receiving a checkpoint request;
    incident to said receipt of the checkpoint request, performing operations comprising:

establishing a barrier between workers of the first nodes, and enabling the workers to communicate across the barrier using at least one multi-GPU communication primitive or an out-of-band (OOB) channel;

for a subset or all of the DLT jobs, capturing graphics processing unit (GPU) states of GPUs executing the DLT jobs on the workers, wherein the GPU states include GPU data comprising model parameter and optimizer state;

for the subset or all of the DLT jobs capturing central processing unit (CPU) states of CPUs executing the DLT jobs on the workers; and migrating the subset or all of the DLT jobs to the plurality of second nodes at checkpointed states using the GPU states and the CPU states.

11. The method of claim 10, wherein a barrier is established so that each node is able to be checkpointed.

12. The method of claim 11, wherein AllReduce operations for establishing the barrier comprise computing maximum and AllReduce count values across the workers.

13. The method of claim 11, wherein the barrier is established through, in part, performing a meta AllReduce operation.

14. The method of claim 10, wherein the at least one multi-GPU communication primitive is set to operate in a background thread.

15. A system for operating a cloud computing environment that facilitates halting deep learning training (DLT) jobs and resuming the DLT jobs from a checkpointed state in a different area of a cloud computing environment, the system comprising:

a first node in a plurality of first nodes providing processing resources for the DLT jobs;

a second node in a plurality of second nodes providing secondary processing resources for the DLT jobs, wherein the DLT jobs are halted on the plurality of first nodes through:

isolating GPU-related activity of the DLT job across the plurality of first nodes in the cloud computing environment into a separate proxy process, and during said isolation, allowing the DLT job to continue computation in a main process, wherein said computation comprises Python code with PT/TF training loop, and wherein the proxy process is stateless across a plurality of checkpoints; and wherein at least a portion of the DLT jobs are migrated to the plurality of second nodes using the proxy process and the main process.

16. The system of claim 15, wherein the DLT job is a PyTorch job.

17. The system of claim 15, wherein the DLT job is a TensorFlow job.

18. The system of claim 15, wherein migration of the DLT job is performed through the proxy process:

directing a proxy node to read model parameters from shared memory and executes corresponding GPU calls in an address space of the proxy node, and transmitting return values to a proxy client through shared memory.

19. The system of claim 15, wherein migration of the DLT job is performed through the proxy process:

moving GPU-related activity of the DLT job into a separate address space using dynamic library interposition on GPU-related calls, wherein the GPU-related calls are intercepted in the main process by a client of the proxy process, which serializes and writes GPU function call parameters into shared memory.

* * * * *